United States Patent
Sun et al.

(10) Patent No.: US 11,006,408 B2
(45) Date of Patent: May 11, 2021

(54) SLOT FORMAT DETERMINATION FOR EXTENDED CYCLIC PREFIX TRANSMISSIONS USING NORMAL CYCLIC PREFIX SLOT FORMATS

(71) Applicant: QUALCOMM Incorporated, San Diego, CA (US)

(72) Inventors: Jing Sun, San Diego, CA (US); Heechoon Lee, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 16/284,462

(22) Filed: Feb. 25, 2019

(65) Prior Publication Data

US 2019/0268902 A1 Aug. 29, 2019

Related U.S. Application Data

(60) Provisional application No. 62/635,507, filed on Feb. 26, 2018.

(51) Int. Cl.
*H04W 72/04* (2009.01)
*H04L 5/00* (2006.01)
*H04L 27/26* (2006.01)

(52) U.S. Cl.
CPC ....... *H04W 72/0446* (2013.01); *H04L 5/0053* (2013.01); *H04L 5/0092* (2013.01); *H04L 27/2607* (2013.01); *H04W 72/042* (2013.01)

(58) Field of Classification Search
CPC . H04L 5/0053; H04L 5/0092; H04L 27/2607; H04W 72/04; H04W 72/042; H04W 72/0446; H04W 72/12
See application file for complete search history.

(56) References Cited

U.S. PATENT DOCUMENTS 10,356,800 B2 * 7/2019 Manolakos ........... H04L 5/0007
10,721,036 B2 * 7/2020 Yi ..................... H04W 72/0446
(Continued)

FOREIGN PATENT DOCUMENTS

WO WO-2009084922 A2 7/2009
WO WO-2017132212 A1 8/2017
(Continued)

OTHER PUBLICATIONS

Huawei et al., Remaining details on group-common PDCCH, Dec. 1, 2017, 3GPP, 3GPP TSG RAN WG1 Meeting 91, Tdoc: R1-1719388 (Year: 2017).*

(Continued)

*Primary Examiner* — Eric Nowlin
(74) *Attorney, Agent, or Firm* — Linda G. Gunderson; Holland & Hart LLP

(57) ABSTRACT

Methods, systems, and devices for wireless communications are described that support slot format determination for extended cyclic prefix (ECP) transmissions using normal cyclic prefix (NCP) slot formats. A slot format indicator (SFI) for NCP slots may identify transmission directions (e.g., uplink symbols, downlink symbols, or flexible symbols) for different symbols within a slot, and the SFI may provide an indication of a particular slot format that is to be used. Starting and ending times of each NCP symbol in a slot may be time domain mapped to starting and ending times of each ECP symbol in the slot. A transmission direction of each ECP symbol may be determined based at least in part on the transmission direction of at least a portion of at least one NCP symbol that fully or partially overlaps in the time domain with a corresponding ECP symbol.

26 Claims, 22 Drawing Sheets

(56) References Cited

U.S. PATENT DOCUMENTS

| | | | | |
|---|---|---|---|---|
| 2009/0180435 | A1* | 7/2009 | Sarkar | H04W 56/0035 |
| | | | | 370/330 |
| 2017/0332359 | A1* | 11/2017 | Tsai | H04B 7/0639 |
| 2018/0070341 | A1* | 3/2018 | Islam | H04L 1/1812 |
| 2018/0083817 | A1* | 3/2018 | Salem | H04L 27/2602 |
| 2019/0053227 | A1* | 2/2019 | Huang | H04L 5/0094 |
| 2019/0191433 | A1* | 6/2019 | Park | H04L 27/2607 |
| 2019/0254024 | A1* | 8/2019 | Nam | H04L 27/2607 |
| 2019/0268902 | A1* | 8/2019 | Sun | H04L 5/0092 |
| 2019/0312665 | A1* | 10/2019 | Jo | H04L 5/0078 |
| 2019/0349180 | A1* | 11/2019 | Lu | H04L 5/0094 |
| 2019/0349904 | A1* | 11/2019 | Kwak | H04W 72/042 |
| 2020/0374077 | A1* | 11/2020 | Wang | H04L 5/0048 |

FOREIGN PATENT DOCUMENTS

| | | |
|---|---|---|
| WO | WO-2017213433 A1 | 12/2017 |
| WO | WO-2018050112 A1 | 3/2018 |
| WO | WO-2018063868 A1 | 4/2018 |

OTHER PUBLICATIONS

Huawei et al., Support of 60 kHz subcarrier spacing, Dec. 1, 2017, 3GPP, 3GPP TSG RAN WG1 Meeting #91, Tdoc: R1-1719403 (Year: 2017).*

TCL Communication, Dynamic TDD—SFI Handling and Interference Management, Dec. 1, 2017, 3GPP, 3GPP TSG RAN WG1 Meeting #91, Tdoc: R1-1719706 (Year: 2017).*

Intel Corporation, Remaining aspects of Group common PDCCH and SFI, Dec. 1, 2017, 3GPP, 3GPP TSG RAN WG1 Meeting #91, Tdoc: R1-1720083 (Year: 2017).*

CATT, On semi-static and dynamic signaling of SFI, Dec. 1, 2017, 3GPP, 3GPP TSG RAN WG1 Meeting #91, Tdoc: R1-1720192 (Year: 2017).*

InterDigital Inc., On configuration of GC-PDCCH for dynamic SFI, Dec. 1, 2017, 3GPP, 3GPP TSG RAN WG1 Meeting #91, Tdoc: R1-1720637 (Year: 2017).*

CATR, Discussion on the remaining details of SFI design, Dec. 1, 2017, 3GPP, 3GPP TSG RAN WG1 Meeting #91, Tdoc: R1-1720751 (Year: 2017).*

Qualcomm Incorporated, Offline discussion on GC-PDCCH carrying SFI, Dec. 1, 2017, 3GPP, 3GPP TSG RAN WG1 Meeting #91, Tdoc: R1-1721402 (Year: 2017).*

OPPO, Remaining issues on GC-PDCCH, Jan. 22, 2018, 3GPP TSG RAN WG1 Meeting AH 1801, Tdoc: R1-1800496 (Year: 2018).*

Huawei et al., Remaining issues on SFI with TP, Jan. 22, 2018, 3GPP TSG RAN WG1 Meeting AH 1801, Tdoc: R1-1800838 (Year: 2018).*

Qualcomm Incorporated, Offline discussions on GC-PDCCH carrying SFI, Jan. 22, 2018, 3GPP TSG RAN WG1 Meeting AH 1801, Tdoc: R1-1801082 (Year: 2018).*

Qualcomm Incorporated, Offline discussions on GC-PDCCH carrying SFI, Jan. 22, 2018, 3GPP TSG RAN WG1 Meeting AH 1801, Tdoc: R1-1801254 (Year: 2018).*

Xiaomi, Remaining issues for dynamic SFI, Feb. 26, 2018, 3GPP, 3GPP TSG RAN WG1 Meeting #92, Tdoc: R1-1802682 (Year: 2018).*

Huawei et al., Discussion and TP on slot format for ECP, Feb. 26, 2018, 3GPP, 3GPP TSG RAN WG1 Meeting #92, Tdoc: R1-1802702 (Year: 2018).*

Huawei, et al., "Discussion and TP on Slot Format for ECP", 3GPP TSG RAN WG1 Meeting #92, 3GPP Draft; R1-1802702, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 17, 2018 (Feb. 17, 2018), 6 Pages, XP051398135, Retrieved from the Internet: URL: http://www.3gpp.org/ftp/tsg%5Fran/WG1%5FRL1/TSGR1%5F92/Docs/ [retrieved on Feb. 17, 2018], Sect. s 1, 2.

International Search Report and Written Opinion—PCT/US2019/019563—ISA/EPO—May 24, 2019 (182374WO).

Qualcomm Incorporated: "TP for 38.211 Related to SFI", 3GPP TSG RAN WG1 NR AH 1801, 3GPP Draft; R1-1801266_TP for 38.211 Related to SFI, 3rd Generation Partnership Project (3GPP), Mobile Competence Centre; 650, Route Des Lucioles; F-06921 Sophia-Antipolis Cedex; France, vol. RAN WG1, No. Vancouver, Canada; 20180122-20180126, Jan. 29, 2018 (Jan. 29, 2018), pp. 1-4, XP051385485, Retrieved from the Internet: URL: http://www.3gpp.org/ftp/tsg%5Fran/WG1%5FRL1/TSGR1%5FAH/NR%5FAH%5F1801/Docs/ [retrieved on Jan. 29, 2018] Sect. 2.

Wilus Inc: "Remaining Issues on Group-Common PDCCH for NR", 3GPP TSG RAN WG1 Meeting #92, 3GPP Draft; R1-1802934_SFI, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 17, 2018 (Feb. 17, 2018), 3 Pages, XP051398317, Retrieved from the Internet: URL: http://www.3gpp.org/ftp/tsg%5Fran/WG1%5FRL1/TSGR1%5F92/Docs/ [retrieved on Feb. 17, 2018] Sect. 3.

* cited by examiner

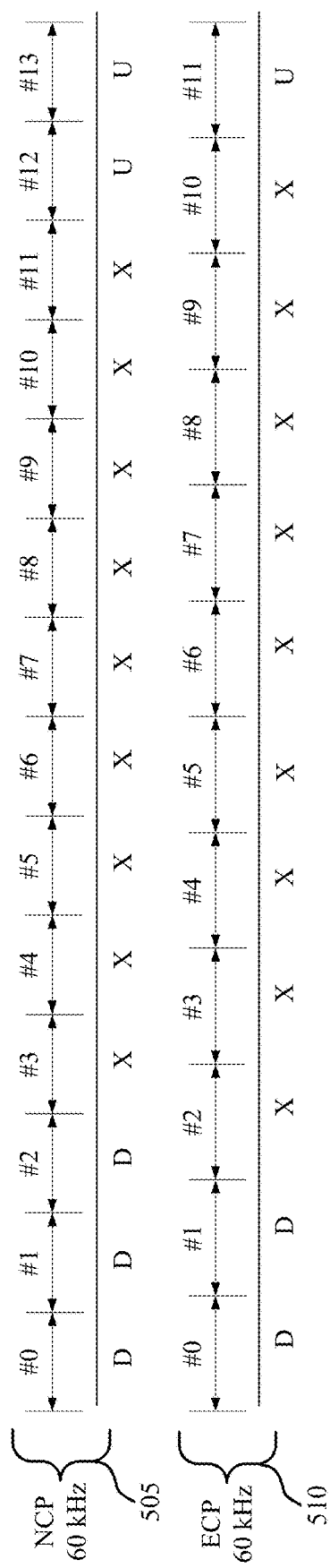
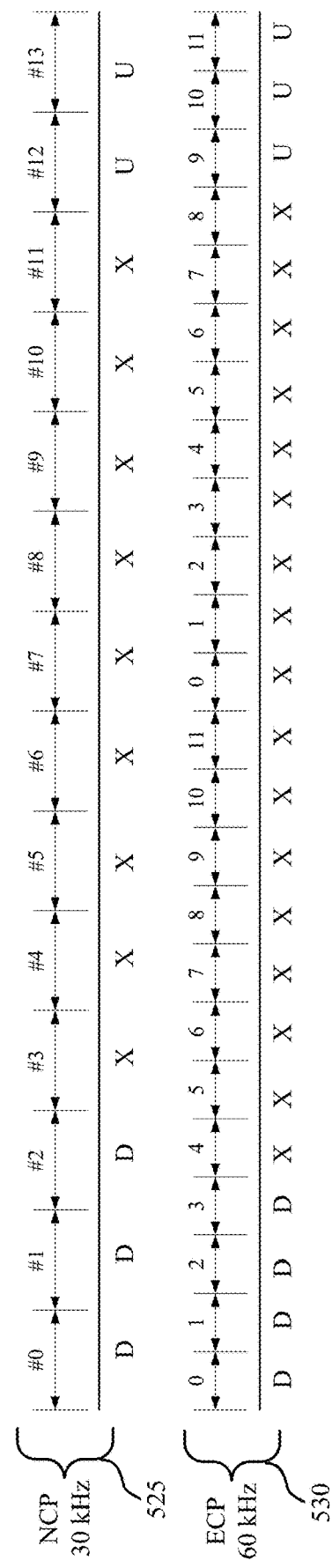
FIG. 5A
FIG. 5B

|    | 0 | 1 | 2 | 3 | 4 | 5 | 6 | 7 | 8 | 9 | 10 | 11 |
|----|---|---|---|---|---|---|---|---|---|---|----|----|
| 0  | D | D | D | D | D | D | D | D | D | D | D | D |
| 1  | U | U | U | U | U | U | U | U | U | U | U | U |
| 2  | X | X | X | X | X | X | X | X | X | X | X | X |
| 3  | D | D | D | D | D | D | D | D | D | D | D | X |
| 4  | D | D | D | D | D | D | D | D | D | D | X | X |
| 5  | D | D | D | D | D | D | D | D | D | X | X | X |
| 6  | D | D | D | D | D | D | D | D | X | X | X | X |
| 7  | D | D | D | D | D | D | D | X | X | X | X | X |
| 8  | X | X | X | X | X | X | X | X | X | X | X | X |
| 9  | X | X | X | X | X | X | X | X | X | X | X | U |
| 10 | X | U | U | U | U | U | U | U | U | U | U | U |
| 11 | X | X | U | U | U | U | U | U | U | U | U | U |
| 12 | X | X | X | U | U | U | U | U | U | U | U | U |
| 13 | X | X | X | X | U | U | U | U | U | U | U | U |
| 14 | X | X | X | X | X | U | U | U | U | U | U | U |
| 15 | X | X | X | X | X | X | U | U | U | U | U | U |
| 16 | X | X | X | X | X | X | X | X | X | X | X | X |
| 17 | D | X | X | X | X | X | X | X | X | X | X | X |
| 18 | D | D | X | X | X | X | X | X | X | X | X | X |
| 19 | X | X | X | X | X | X | X | X | X | X | X | X |
| 20 | D | X | X | X | X | X | X | X | X | X | X | X |
| 21 | D | D | X | X | X | X | X | X | X | X | X | X |
| 22 | X | X | X | X | X | X | X | X | X | X | X | U |
| 23 | D | X | X | X | X | X | X | X | X | X | X | U |
| 24 | D | D | X | X | X | X | X | X | X | X | X | U |
| 25 | X | X | X | X | X | X | X | X | X | X | U | U |
| 26 | D | X | X | X | X | X | X | X | X | X | U | U |
| 27 | D | D | X | X | X | X | X | X | X | X | U | U |
| 28 | D | D | D | D | D | D | D | D | D | D | X | X |
| 29 | D | D | D | D | D | D | D | D | D | X | X | X |
| 30 | D | D | D | D | D | D | D | D | X | X | X | X |
| 31 | D | D | D | D | D | D | D | D | X | X | X | U |
| 32 | D | D | D | D | D | D | D | D | X | X | X | U |
| 33 | D | D | D | D | D | D | D | X | X | X | X | U |
| 34 | X | X | U | U | U | U | U | U | U | U | U | U |
| 35 | D | X | X | U | U | U | U | U | U | U | U | U |
| 36 | D | D | X | X | U | U | U | U | U | U | U | U |
| 37 | X | X | X | U | U | U | U | U | U | U | U | U |
| 38 | D | X | X | X | U | U | U | U | U | U | U | U |
| 39 | D | D | X | X | X | U | U | U | U | U | U | U |
| 40 | X | X | X | X | U | U | U | U | U | U | U | U |
| 41 | D | X | X | X | X | U | U | U | U | U | U | U |
| 42 | D | D | X | X | X | X | U | U | U | U | U | U |
| 43 | D | D | D | D | D | D | D | X | X | X | X | X |
| 44 | D | D | D | D | D | X | X | X | X | X | X | U |
| 45 | D | D | D | D | D | X | X | U | U | U | U | U |
| 46 | D | D | D | D | X | X | D | D | D | D | X | X |
| 47 | D | X | X | U | U | U | D | X | X | U | U | U |
| 48 | X | X | U | U | U | U | X | X | U | U | U | U |
| 49 | D | D | D | X | X | X | D | D | D | X | X | X |
| 50 | D | X | X | X | U | U | D | X | X | X | U | U |
| 51 | X | X | X | U | U | U | X | X | X | U | U | U |
| 52 | X | X | X | X | X | X | X | X | X | X | X | X |
| 53 | D | X | X | X | X | X | D | X | X | X | X | X |
| 54 | X | X | X | X | X | X | D | D | D | D | D | D |
| 55 | D | X | X | X | X | U | U | D | D | D | D | D |

|    | 0 | 1 | 2 | 3 | 4 | 5 | 6 | 7 | 8 | 9 | 10 | 11 |
|----|---|---|---|---|---|---|---|---|---|---|----|----|
| 0  | D | D | D | D | D | D | D | D | D | D | D  | D  |
| 1  | U | U | U | U | U | U | U | U | U | U | U  | U  |
| 2  | X | X | X | X | X | X | X | X | X | X | X  | X  |
| 3  | D | D | D | D | D | D | D | D | D | D | D  | X  |
| 4  | D | D | D | D | D | D | D | D | D | D | X  | X  |
| 5  | D | D | D | D | D | D | D | D | D | X | X  | X  |
| 6  | D | D | D | D | D | D | D | D | D | X | X  | X  |
| 7  | D | D | D | D | D | D | D | D | X | X | X  | X  |
| 8  | X | X | X | X | X | X | X | X | X | X | X  | U  |
| 9  | X | X | X | X | X | X | X | X | X | X | U  | U  |
| 10 | X | U | U | U | U | U | U | U | U | U | U  | U  |
| 11 | X | X | U | U | U | U | U | U | U | U | U  | U  |
| 12 | X | X | X | U | U | U | U | U | U | U | U  | U  |
| 13 | X | X | X | U | U | U | U | U | U | U | U  | U  |
| 14 | X | X | X | X | U | U | U | U | U | U | U  | U  |
| 15 | X | X | X | X | X | U | U | U | U | U | U  | U  |
| 16 | D | X | X | X | X | X | X | X | X | X | X  | X  |
| 17 | D | D | X | X | X | X | X | X | X | X | X  | X  |
| 18 | D | D | D | X | X | X | X | X | X | X | X  | X  |
| 19 | D | X | X | X | X | X | X | X | X | X | X  | U  |
| 20 | D | D | X | X | X | X | X | X | X | X | X  | U  |
| 21 | D | D | D | X | X | X | X | X | X | X | X  | U  |
| 22 | D | X | X | X | X | X | X | X | X | X | U  | U  |
| 23 | D | D | X | X | X | X | X | X | X | X | U  | U  |
| 24 | D | D | D | X | X | X | X | X | X | X | U  | U  |
| 25 | D | X | X | X | X | X | X | X | X | U | U  | U  |
| 26 | D | D | X | X | X | X | X | X | X | U | U  | U  |
| 27 | D | D | D | X | X | X | X | X | X | U | U  | U  |
| 28 | D | D | D | D | D | D | D | D | D | D | X  | U  |
| 29 | D | D | D | D | D | D | D | D | D | X | X  | U  |
| 30 | D | D | D | D | D | D | D | D | D | X | X  | U  |
| 31 | D | D | D | D | D | D | D | D | D | X | U  | U  |
| 32 | D | D | D | D | D | D | D | D | X | U | U  | U  |
| 33 | D | D | D | D | D | D | D | X | X | U | U  | U  |
| 34 | D | X | U | U | U | U | U | U | U | U | U  | U  |
| 35 | D | D | X | U | U | U | U | U | U | U | U  | U  |
| 36 | D | D | D | U | U | U | U | U | U | U | U  | U  |
| 37 | D | X | X | U | U | U | U | U | U | U | U  | U  |
| 38 | D | D | X | U | U | U | U | U | U | U | U  | U  |
| 39 | D | D | D | X | U | U | U | U | U | U | U  | U  |
| 40 | D | X | X | U | U | U | U | U | U | U | U  | U  |
| 41 | D | D | X | X | U | U | U | U | U | U | U  | U  |
| 42 | D | D | D | X | X | U | U | U | U | U | U  | U  |
| 43 | D | D | D | D | D | D | D | D | X | X | X  | U  |
| 44 | D | D | D | D | D | X | X | X | X | X | U  | U  |
| 45 | D | D | D | D | X | X | U | U | U | U | U  | U  |
| 46 | D | D | D | D | X | U | D | D | D | D | X  | U  |
| 47 | D | D | X | U | U | U | D | X | U | U | U  | U  |
| 48 | D | X | U | U | U | U | D | X | U | U | U  | U  |
| 49 | D | D | D | X | X | U | D | D | X | X | X  | U  |
| 50 | D | D | X | U | U | U | D | X | U | U | U  | U  |
| 51 | D | X | X | U | U | U | D | X | X | U | U  | U  |
| 52 | D | X | X | X | X | U | D | X | X | X | X  | U  |
| 53 | D | D | X | X | X | U | D | D | X | X | X  | U  |
| 54 | X | X | X | X | X | X | D | D | D | D | D  | D  |
| 55 | D | D | X | X | U | U | U | D | D | D | D  | D  |

SLOT FORMAT DETERMINATION FOR EXTENDED CYCLIC PREFIX TRANSMISSIONS USING NORMAL CYCLIC PREFIX SLOT FORMATS

CROSS REFERENCE

The present Application for Patent claims the benefit of U.S. Provisional Patent Application No. 62/635,507 by SUN, et al., entitled "SLOT FORMAT DETERMINATION FOR EXTENDED CYCLIC PREFIX TRANSMISSIONS USING NORMAL CYCLIC PREFIX SLOT FORMATS," filed Feb. 26, 2018, assigned to the assignee hereof, and expressly incorporated by reference herein in its entirety.

BACKGROUND

The following relates generally to wireless communication, and more specifically to slot format determination for extended cyclic prefix transmissions using normal cyclic prefix slot formats.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Transmissions in wireless communications systems such as LTE and NR systems may use a cyclic prefix (CP) to provide a guard period at the start of each OFDMA symbol which provides protection against multi-path delay spread. The CP may be generated by copying the end of the main body of the OFDMA symbol to a beginning of the OFDMA symbol, such that a frequency domain representation of each delay spread component within a fast Fourier transform (FFT) processing window is the same. Both a normal CP (NCP) and an extended CP (ECP) length may be specified in systems, with the NCP intended to be sufficient for the majority of scenarios and the ECP intended for scenarios with relatively high delay spread. Some wireless communications systems may provide slot formats for NCP and ECP symbols, in which fewer ECP symbols may be present for in a slot than NCP symbols. Efficient techniques for identifying ECP and NCP symbols within slots may be desirable to help enhance system efficiency.

SUMMARY

The described techniques relate to improved methods, systems, devices, or apparatuses that support slot format determination for extended cyclic prefix transmissions using normal cyclic prefix slot formats. Generally, the described techniques provide for slot format determination for extended cyclic prefix (ECP) slots based on a slot format indicator (SFI) for normal cyclic prefix (NCP) slots. In some cases, slot formats may identify transmission directions (e.g., uplink symbols, downlink symbols, or flexible symbols) for different symbols within a slot, and the SFI may provide an indication of a particular slot format that is to be used. In some cases, an SFI may be provided for slots using NCP symbols, and starting and ending times of each NCP symbol in a slot may be time domain mapped to starting and ending times of each ECP symbol in the slot. A transmission direction of each ECP symbol may be determined based at least in part on the transmission direction of at least a portion of at least one NCP symbol that fully or partially overlaps in the time domain with a corresponding ECP symbol. In some cases, the slot format may be based on a reference subcarrier spacing (SCS) for the NCP transmissions, and the ECP symbols have a different SCS than the reference SCS.

A method of wireless communication is described. The method may include identifying, at a UE, a slot format for NCP transmissions between the UE and a base station, the slot format indicating a transmission direction for each NCP symbol of a set of NCP symbols within a slot, mapping, using a time domain comparison of the starting and ending time of each NCP symbol and each ECP symbol of a set of ECP symbols, the set of NCP symbols to the set of ECP symbols, where the set of ECP symbols each have a larger cyclic prefix than the NCP symbols, and determining, based at least in part on the transmission direction of at least a portion of at least one NCP symbol that fully or partially overlaps in the time domain with a corresponding ECP symbol, a transmission direction of the corresponding ECP symbol.

An apparatus for wireless communication is described. The apparatus may include means for identifying, at a UE, a slot format for NCP transmissions between the UE and a base station, the slot format indicating a transmission direction for each NCP symbol of a set of NCP symbols within a slot, means for mapping, using a time domain comparison of the starting and ending time of each NCP symbol and each ECP symbol of a set of ECP symbols, the set of NCP symbols to the set of ECP symbols, where the set of ECP symbols each have a larger cyclic prefix than the NCP symbols, and means for determining, based at least in part on the transmission direction of at least a portion of at least one NCP symbol that fully or partially overlaps in the time domain with a corresponding ECP symbol, a transmission direction of the corresponding ECP symbol.

Another apparatus for wireless communication is described. The apparatus may include a processor, memory in electronic communication with the processor, and instructions stored in the memory. The instructions may be operable to cause the processor to identify, at a UE, a slot format for NCP transmissions between the UE and a base station, the slot format indicating a transmission direction for each NCP symbol of a set of NCP symbols within a slot, map, using a time domain comparison of the starting and ending time of each NCP symbol and each ECP symbol of a set of ECP symbols, the set of NCP symbols to the set of ECP symbols, where the set of ECP symbols each have a larger cyclic prefix than the NCP symbols, and determine, based at least in part on the transmission direction of at least a portion of at least one NCP symbol that fully or partially overlaps in the time domain with a corresponding ECP symbol, a transmission direction of the corresponding ECP symbol.

A non-transitory computer-readable medium for wireless communication is described. The non-transitory computer-readable medium may include instructions operable to cause a processor to identify, at a UE, a slot format for NCP transmissions between the UE and a base station, the slot format indicating a transmission direction for each NCP symbol of a set of NCP symbols within a slot, map, using a time domain comparison of the starting and ending time of each NCP symbol and each ECP symbol of a set of ECP symbols, the set of NCP symbols to the set of ECP symbols, where the set of ECP symbols each have a larger cyclic prefix than the NCP symbols, and determine, based at least in part on the transmission direction of at least a portion of at least one NCP symbol that fully or partially overlaps in the time domain with a corresponding ECP symbol, a transmission direction of the corresponding ECP symbol.

In some examples of the method, apparatus, and non-transitory computer-readable medium described above, the determining may include identifying, based at least in part on the mapping, a subset of the NCP symbols that overlap in the time domain with a first ECP symbol of the set of ECP symbols, and determining that the first ECP symbol may have a flexible transmission direction when at least one of the NCP symbols of the subset of the NCP symbols may have a flexible transmission direction. In some examples of the method, apparatus, and non-transitory computer-readable medium described above, the determining may further include determining that the first ECP symbol may have an uplink transmission direction when each of the NCP symbols of the subset of the NCP symbols may have an uplink transmission direction, and determining that the first ECP symbol may have a downlink transmission direction when each of the NCP symbols of the subset of the NCP symbols may have a downlink transmission direction.

Some examples of the method, apparatus, and non-transitory computer-readable medium described above may further include processes, features, means, or instructions for identifying an ordered set of transmission directions. Some examples of the method, apparatus, and non-transitory computer-readable medium described above may further include processes, features, means, or instructions for identifying, based at least in part on the mapping, a subset of the NCP symbols that fully or partially overlap in the time domain with a first ECP symbol of the set of ECP symbols. Some examples of the method, apparatus, and non-transitory computer-readable medium described above may further include processes, features, means, or instructions for determining the transmission direction of the first ECP symbol based on a highest ordered transmission direction of the ordered set of transmission directions within the subset of the NCP symbols. In some examples of the method, apparatus, and non-transitory computer-readable medium described above, the transmission direction indicates that an ECP symbol may have an uplink transmission direction, a downlink transmission direction, or a flexible transmission direction, and where the flexible transmission direction may have a highest ordered transmission direction in the ordered set of transmission directions, the downlink transmission direction may have a middle ordered transmission direction in the ordered set of transmission directions, and the uplink transmission direction may have a lowest ordered transmission direction in the ordered set of transmission directions.

In some examples of the method, apparatus, and non-transitory computer-readable medium described above, the determining may include identifying, based at least in part on the mapping, a subset of the NCP symbols that fully or partially overlap in the time domain with a first ECP symbol of the set of ECP symbols, determining one or more portions in the time domain of the first ECP symbol that correspond to one or more NCP symbols, or portions thereof, of the subset of the NCP symbols, and determining that the first ECP symbol transmission direction corresponds to the NCP symbol transmission direction of a longest of the one or more portions in the time domain of the first ECP symbol.

In some examples of the method, apparatus, and non-transitory computer-readable medium described above, the slot format may be based on a reference SCS for the NCP transmissions, and where the ECP symbols may have a different SCS than the reference SCS. In some examples of the method, apparatus, and non-transitory computer-readable medium described above, the slot format may be identified based at least in part on a group common physical downlink control channel (GC-PDCCH) transmission received from the base station.

A method of wireless communication is described. The method may include identifying, at a UE, a slot format for NCP transmissions between the UE and a base station, the slot format indicating a transmission direction for each NCP symbol of a set of NCP symbols within a slot, and determining, based at least in part on the transmission direction of at least a portion of at least one NCP symbol that fully or partially overlaps in the time domain with a corresponding ECP symbol, a transmission direction of the corresponding ECP symbol, where a starting and ending time of each NCP symbol is mapped to each ECP symbol of a set of ECP symbols in the time domain.

An apparatus for wireless communication is described. The apparatus may include means for identifying, at a UE, a slot format for NCP transmissions between the UE and a base station, the slot format indicating a transmission direction for each NCP symbol of a set of NCP symbols within a slot, and determining, based at least in part on the transmission direction of at least a portion of at least one NCP symbol that fully or partially overlaps in the time domain with a corresponding ECP symbol, a transmission direction of the corresponding ECP symbol, where a starting and ending time of each NCP symbol is mapped to each ECP symbol of a set of ECP symbols in the time domain.

Another apparatus for wireless communication is described. The apparatus may include a processor, memory in electronic communication with the processor, and instructions stored in the memory. The instructions may be operable to cause the processor to identify, at a UE, a slot format for NCP transmissions between the UE and a base station, the slot format indicating a transmission direction for each NCP symbol of a set of NCP symbols within a slot, and determine, based at least in part on the transmission direction of at least a portion of at least one NCP symbol that fully or partially overlaps in the time domain with a corresponding ECP symbol, a transmission direction of the corresponding ECP symbol, where a starting and ending time of each NCP symbol is mapped to each ECP symbol of a set of ECP symbols in the time domain.

A non-transitory computer-readable medium for wireless communication is described. The non-transitory computer-readable medium may include instructions operable to cause a processor to identify, at a UE, a slot format for NCP transmissions between the UE and a base station, the slot format indicating a transmission direction for each NCP symbol of a set of NCP symbols within a slot, and determine, based at least in part on the transmission direction of at least a portion of at least one NCP symbol that fully or partially overlaps in the time domain with a corresponding ECP symbol, a transmission direction of the corresponding ECP symbol, where a starting and ending time of each NCP symbol is mapped to each ECP symbol of a set of ECP symbols in the time domain.

In some examples of the method, apparatus, and non-transitory computer-readable medium described above, the determining may include identifying a subset of the NCP symbols that overlap in the time domain with a first ECP symbol of the set of ECP symbols, and determining that the first ECP symbol may have a flexible transmission direction when at least one of the NCP symbols of the subset of the NCP symbols may have a flexible transmission direction. In some examples of the method, apparatus, and non-transitory computer-readable medium described above, the determining may further include determining that the first ECP symbol may have an uplink transmission direction when each of the NCP symbols of the subset of the NCP symbols may have an uplink transmission direction, and determining that the first ECP symbol may have a downlink transmission direction when each of the NCP symbols of the subset of the NCP symbols may have a downlink transmission direction. In some examples of the method, apparatus, and non-transitory computer-readable medium described above, the determining may further include identifying an ordered set of transmission directions, identifying a subset of the NCP symbols that fully or partially overlap in the time domain with a first ECP symbol of the set of ECP symbols, and determining the transmission direction of the first ECP symbol based on a highest ordered transmission direction of the ordered set of transmission directions within the subset of the NCP symbols.

In some examples of the method, apparatus, and non-transitory computer-readable medium described above, the transmission direction may indicate that an ECP symbol has an uplink transmission direction, a downlink transmission direction, or a flexible transmission direction, and wherein the flexible transmission direction has a highest ordered transmission direction in the ordered set of transmission directions, the downlink transmission direction has a middle ordered transmission direction in the ordered set of transmission directions, and the uplink transmission direction has a lowest ordered transmission direction in the ordered set of transmission directions. In some examples of the method, apparatus, and non-transitory computer-readable medium described above, the determining may further include identifying a subset of the NCP symbols that fully or partially overlap in the time domain with a first ECP symbol of the set of ECP symbols, determining one or more portions in the time domain of the first ECP symbol that correspond to one or more NCP symbols, or portions thereof, of the subset of the NCP symbols, and determining that the first ECP symbol transmission direction corresponds to the NCP symbol transmission direction of a longest of the one or more portions in the time domain of the first ECP symbol.

In some examples of the method, apparatus, and non-transitory computer-readable medium described above, the slot format may be based on a reference sub-carrier spacing (SCS) for the NCP transmissions, and wherein the ECP symbols have a different SCS than the reference SCS. In some examples of the method, apparatus, and non-transitory computer-readable medium described above, the slot format may be identified based at least in part on a group common physical downlink control channel (GC-PDCCH) transmission received from the base station.

A method of wireless communication is described. The method may include identifying, at a base station, a slot format for NCP transmissions between a UE and the base station, the slot format indicating a transmission direction for each NCP symbol of a set of NCP symbols within a slot, transmitting an indication of the slot format to the UE, mapping, using a time domain comparison of the starting and ending time of each NCP symbol and each ECP symbol of a set of ECP symbols, the set of NCP symbols to the set of ECP symbols, where the set of ECP symbols each have a larger cyclic prefix than the NCP symbols, determining, based at least in part on the transmission direction of at least a portion of at least one NCP symbol that fully or partially overlaps in the time domain with a corresponding ECP symbol, a transmission direction of the corresponding ECP symbol, and transmitting one or more ECP symbols to the UE based at least in part on the determining.

An apparatus for wireless communication is described. The apparatus may include means for identifying, at a base station, a slot format for NCP transmissions between a UE and the base station, the slot format indicating a transmission direction for each NCP symbol of a set of NCP symbols within a slot, means for transmitting an indication of the slot format to the UE, means for mapping, using a time domain comparison of the starting and ending time of each NCP symbol and each ECP symbol of a set of ECP symbols, the set of NCP symbols to the set of ECP symbols, wherein the set of ECP symbols each have a larger cyclic prefix than the NCP symbols, means for determining, based at least in part on the transmission direction of at least a portion of at least one NCP symbol that fully or partially overlaps in the time domain with a corresponding ECP symbol, a transmission direction of the corresponding ECP symbol, and means for transmitting one or more ECP symbols to the UE based at least in part on the determining.

Another apparatus for wireless communication is described. The apparatus may include a processor, memory in electronic communication with the processor, and instructions stored in the memory. The instructions may be operable to cause the processor to identify, at a base station, a slot format for NCP transmissions between a UE and the base station, the slot format indicating a transmission direction for each NCP symbol of a set of NCP symbols within a slot, transmit an indication of the slot format to the UE, map, using a time domain comparison of the starting and ending time of each NCP symbol and each ECP symbol of a set of ECP symbols, the set of NCP symbols to the set of ECP symbols, where the set of ECP symbols each have a larger cyclic prefix than the NCP symbols, determine, based at least in part on the transmission direction of at least a portion of at least one NCP symbol that fully or partially overlaps in the time domain with a corresponding ECP symbol, a transmission direction of the corresponding ECP symbol, and transmit one or more ECP symbols to the UE based at least in part on the determining.

A non-transitory computer-readable medium for wireless communication is described. The non-transitory computer-readable medium may include instructions operable to cause a processor to identify, at a base station, a slot format for NCP transmissions between a UE and the base station, the slot format indicating a transmission direction for each NCP symbol of a set of NCP symbols within a slot, transmit an indication of the slot format to the UE, map, using a time domain comparison of the starting and ending time of each NCP symbol and each ECP symbol of a set of ECP symbols, the set of NCP symbols to the set of ECP symbols, where the set of ECP symbols each have a larger cyclic prefix than the NCP symbols, determine, based at least in part on the transmission direction of at least a portion of at least one NCP symbol that fully or partially overlaps in the time domain with a corresponding ECP symbol, a transmission direction of the corresponding ECP symbol, and transmit one or more ECP symbols to the UE based at least in part on the determining.

In some examples of the method, apparatus, and non-transitory computer-readable medium described above, the determining may include identifying, based at least in part on the mapping, a subset of the NCP symbols that overlap in the time domain with a first ECP symbol of the set of ECP symbols, and determining that the first ECP symbol may have a flexible transmission direction when at least one of the NCP symbols of the subset of the NCP symbols may have a flexible transmission direction. In some examples of the method, apparatus, and non-transitory computer-readable medium described above, the determining may further include determining that the first ECP symbol may have an uplink transmission direction when each of the NCP symbols of the subset of the NCP symbols may have an uplink transmission direction, and determining that the first ECP symbol may have a downlink transmission direction when each of the NCP symbols of the subset of the NCP symbols may have a downlink transmission direction.

Some examples of the method, apparatus, and non-transitory computer-readable medium described above may further include processes, features, means, or instructions for identifying an ordered set of transmission directions. Some examples of the method, apparatus, and non-transitory computer-readable medium described above may further include processes, features, means, or instructions for identifying, based at least in part on the mapping, a subset of the NCP symbols that fully or partially overlap in the time domain with a first ECP symbol of the set of ECP symbols. Some examples of the method, apparatus, and non-transitory computer-readable medium described above may further include processes, features, means, or instructions for determining the transmission direction of the first ECP symbol based on a highest ordered transmission direction of the ordered set of transmission directions within the subset of the NCP symbols. In some examples of the method, apparatus, and non-transitory computer-readable medium described above, the transmission direction indicates that an ECP symbol may have an uplink transmission direction, a downlink transmission direction, or a flexible transmission direction, and where the flexible transmission direction may have a highest ordered transmission direction in the ordered set of transmission directions, the downlink transmission direction may have a middle ordered transmission direction in the ordered set of transmission directions, and the uplink transmission direction may have a lowest ordered transmission direction in the ordered set of transmission directions.

In some examples of the method, apparatus, and non-transitory computer-readable medium described above, the determining may include identifying, based at least in part on the mapping, a subset of the NCP symbols that fully or partially overlap in the time domain with a first ECP symbol of the set of ECP symbols, determining one or more portions of the time domain of the first ECP symbol that correspond to one or more NCP symbols, or portions thereof, of the subset of the NCP symbols, and determining that the first ECP symbol transmission direction corresponds to the NCP symbol transmission direction of a longest of the one or more portions of the time domain of the first ECP symbol.

In some examples of the method, apparatus, and non-transitory computer-readable medium described above, the slot format may be based on a reference SCS for the NCP transmissions, and where the ECP symbols may have a different SCS than the reference SCS. In some examples of the method, apparatus, and non-transitory computer-readable medium described above, the slot format may be identified based at least in part on a GC-PDCCH transmission received from the base station.

A method of wireless communication is described. The method may include identifying, at a base station, a slot format for NCP transmissions between a UE and the base station, the slot format indicating a transmission direction for each NCP symbol of a set of NCP symbols within a slot, transmitting an indication of the slot format to the UE, determining, based at least in part on the transmission direction of at least a portion of at least one NCP symbol that fully or partially overlaps in the time domain with a corresponding ECP symbol, a transmission direction of the corresponding ECP symbol, where a starting and ending time of each NCP symbol is mapped to each ECP symbol of a set of ECP symbols in the time domain, and communicating with the UE based at least in part on the determining.

An apparatus for wireless communication is described. The apparatus may include means for identifying, at a base station, a slot format for NCP transmissions between a UE and the base station, the slot format indicating a transmission direction for each NCP symbol of a set of NCP symbols within a slot, transmitting an indication of the slot format to the UE, determining, based at least in part on the transmission direction of at least a portion of at least one NCP symbol that fully or partially overlaps in the time domain with a corresponding ECP symbol, a transmission direction of the corresponding ECP symbol, where a starting and ending time of each NCP symbol is mapped to each ECP symbol of a set of ECP symbols in the time domain, and communicating with the UE based at least in part on the determining.

Another apparatus for wireless communication is described. The apparatus may include a processor, memory in electronic communication with the processor, and instructions stored in the memory. The instructions may be operable to cause the processor to identify, at a base station, a slot format for NCP transmissions between a UE and the base station, the slot format indicating a transmission direction for each NCP symbol of a set of NCP symbols within a slot, transmitting an indication of the slot format to the UE, determine, based at least in part on the transmission direction of at least a portion of at least one NCP symbol that fully or partially overlaps in the time domain with a corresponding ECP symbol, a transmission direction of the corresponding ECP symbol, where a starting and ending time of each NCP symbol is mapped to each ECP symbol of a set of ECP symbols in the time domain, and communicating with the UE based at least in part on the determining.

A non-transitory computer-readable medium for wireless communication is described. The non-transitory computer-readable medium may include instructions operable to cause a processor to identifying, at a base station, a slot format for NCP transmissions between a UE and the base station, the slot format indicating a transmission direction for each NCP symbol of a set of NCP symbols within a slot, transmitting an indication of the slot format to the UE, determining, based at least in part on the transmission direction of at least a portion of at least one NCP symbol that fully or partially overlaps in the time domain with a corresponding ECP symbol, a transmission direction of the corresponding ECP symbol, where a starting and ending time of each NCP symbol is mapped to each ECP symbol of a set of ECP symbols in the time domain, and communicating with the UE based at least in part on the determining.

In some examples of the method, apparatus, and non-transitory computer-readable medium described above, the configuring may include configuring the UE to identify a subset of the NCP symbols that overlap in the time domain with a first ECP symbol of the set of ECP symbols, and configuring the UE to determine that the first ECP symbol has a flexible transmission direction when at least one of the NCP symbols of the subset of the NCP symbols has a flexible transmission direction. In some examples of the method, apparatus, and non-transitory computer-readable medium described above, the configuring may include configuring the UE to determine that the first ECP symbol has an uplink transmission direction when each of the NCP symbols of the subset of the NCP symbols has an uplink transmission direction, and configuring the UE to determine that the first ECP symbol has a downlink transmission direction when each of the NCP symbols of the subset of the NCP symbols has a downlink transmission direction. In some examples of the method, apparatus, and non-transitory computer-readable medium described above, the configuring may include configuring the UE to identify an ordered set of transmission directions, configuring the UE to identify a subset of the NCP symbols that fully or partially overlap in the time domain with a first ECP symbol of the second set of ECP symbols, and configuring the UE to determine the transmission direction of the first ECP symbol based on a highest ordered transmission direction of the ordered set of transmission directions within the subset of the NCP symbols.

In some examples of the method, apparatus, and non-transitory computer-readable medium described above, the transmission direction may indicate that an ECP symbol has an uplink transmission direction, a downlink transmission direction, or a flexible transmission direction, and wherein the flexible transmission direction has a highest ordered transmission direction in the ordered set of transmission directions, the downlink transmission direction has a middle ordered transmission direction in the ordered set of transmission directions, and the uplink transmission direction has a lowest ordered transmission direction in the ordered set of transmission directions. In some examples of the method, apparatus, and non-transitory computer-readable medium described above, the configuring may include configuring the UE to identify a subset of the NCP symbols that fully or partially overlap in the time domain with a first ECP symbol of the second set of ECP symbols, configuring the UE to determine one or more portions of the time domain of the first ECP symbol that correspond to one or more NCP symbols, or portions thereof, of the subset of the NCP symbols, and configuring the UE to determine that the first ECP symbol transmission direction corresponds to the NCP symbol transmission direction of a longest of the one or more portions of the time domain of the first ECP symbol. In some examples of the method, apparatus, and non-transitory computer-readable medium described above, the slot format may be based on a reference sub-carrier spacing (SCS) for the NCP transmissions, and wherein the ECP symbols have a different SCS than the reference SCS. In some examples of the method, apparatus, and non-transitory computer-readable medium described above, the slot format is identified based at least in part on a group common physical downlink control channel (GC-PDCCH) transmission received from the base station.

BRIEF DESCRIPTION OF THE DRAWINGS

FIGS. 5A and 5B illustrate examples of slot format determination for extended cyclic prefix transmissions using normal cyclic prefix slot formats in accordance with aspects of the present disclosure.

FIG. 6 illustrates an example of a slot format indicator table that represents an example of slot format determinations for extended cyclic prefix transmissions using normal cyclic prefix slot formats in accordance with aspects of the present disclosure.

FIG. 8 illustrates an example of a slot format indicator table that represents another example of slot format determinations for extended cyclic prefix transmissions using normal cyclic prefix slot formats in accordance with aspects of the present disclosure.

DETAILED DESCRIPTION

Figure 1:
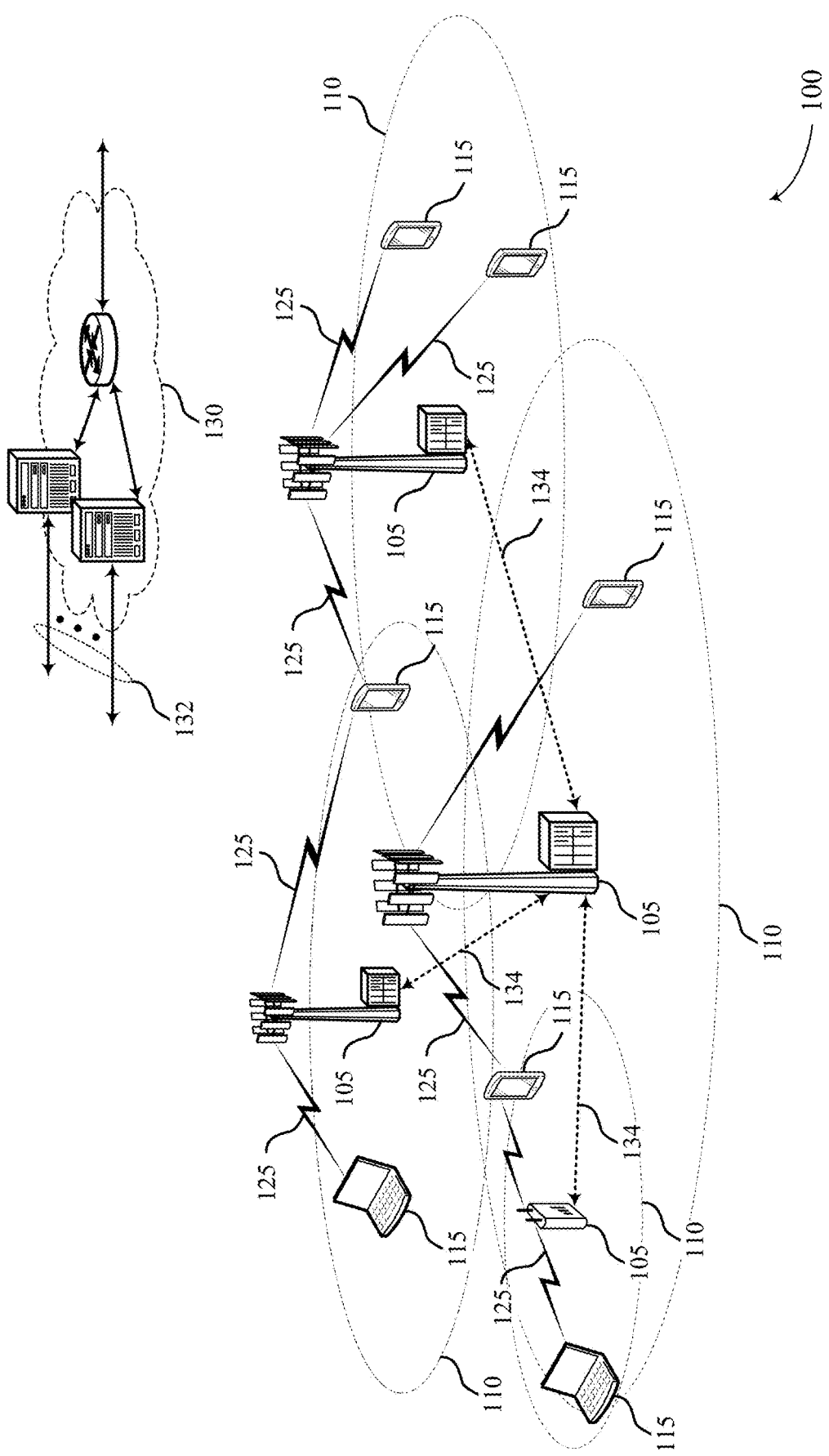
FIG. 1 illustrates an example of a system for wireless communication that supports slot format determination for extended cyclic prefix transmissions using normal cyclic prefix slot formats in accordance with aspects of the present disclosure.

Various techniques described herein provide for slot format determination for extended cyclic prefix (ECP) slots based on a slot format indicator (SFI) for normal cyclic prefix (NCP) slots. As indicated above, various different slot formats may identify transmission directions of different symbols within a slot. In some cases, a slot format may identify which symbols are uplink (U) symbols, which symbols are downlink (D) symbols, and which symbols are flexible (X) symbols that may contain no transmissions or downlink transmissions. In some cases, the SFI may provide an indication of a particular slot format that is to be used, and may be provided for slots using NCP symbols. According to various aspects of the present disclosure, starting and ending times of each NCP symbol in a slot may be time domain mapped to starting and ending times of each ECP symbol in the slot. A transmission direction of each ECP symbol may be determined based at least in part on the transmission direction of at least a portion of at least one NCP symbol that fully or partially overlaps in the time domain with a corresponding ECP symbol.

In some examples, such as in some NR systems, slot formats may be provided by slot format indicator (SFI) carried in a group common physical downlink control channel (GC-PDCCH) transmission. In some cases, SFI in GC-PDCCH may indicate single slot format or multi-slot format. In some examples, different slot formats for NCP symbols are defined in a table with 14 columns, each corresponds to one NCP symbol out of 14 symbols in a slot. Further, NCP symbols may have a sub-carrier spacing (SCS) that may be selected from a number of different available SCSs (e.g., 15 kHz, 30 kHz, 60 kHz, etc.), some of all of which may also support ECP symbols. In some cases, the reference SCS for the SFI may be equal to or smaller than a target bandwidth part (BWP) SCS.

Various techniques provided herein may allow determination of a slot format for ECP symbols based on the signaled SFI and a slot format table that is defined for NCP symbols. Such techniques allow a slot format determination directly rather than through different tables for ECP symbols or dropping of columns from NCP tables. A base station or a UE may determine the ECP symbol direction (D or X or U) considering the indicated direction within the ECP symbol from NCP indication based on a time domain mapping of the ECP symbols and NCP symbols. System design and operation may thus be enhanced through reduced signaling overhead associated with ECP transmissions, reduced storage of multiple different slot format tables, and defined mapping rules for determining ECP symbol direction based on corresponding NCP symbol directions.

In some cases, within a time domain range of an ECP symbol, if any part of a fully or partially overlapping NCP symbol direction is X, as indicated by the NCP based SFI indication, the ECP symbol direction is determined to be X. On the other hand, if the entire time domain range of the ECP symbol overlaps with only D or U direction NCP symbols, as indicated by the NCP based indication, the ECP symbol is D or U. In other cases, a rounding rule may be used, and a transmission direction of an ECP symbol may be determined based on whether a dominant portion of the time domain of an ECP symbol maps to a D, X, or U direction of fully or partially overlapping NCP symbols. Thus, if overlapping NCP symbols all have one transmission direction, the ECP symbol may that direction, and if the overlapping NCP symbols have two transmission directions, the longer time duration direction is selected. Any of the techniques provided herein may also be used in cases where the NCP indication uses different reference SCS than a SCS that is to be used for ECP symbols in a slot.

Aspects of the disclosure are initially described in the context of a wireless communications system. Various examples of ECP slot format determination based on NCP slot formats are then described. Aspects of the disclosure are further illustrated by and described with reference to apparatus diagrams, system diagrams, and flowcharts that relate to slot format determination for extended cyclic prefix transmissions using normal cyclic prefix slot formats.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 and UEs 115 may use ECPs for transmissions and a slot format for the ECP transmissions may be determined based on a NCP slot format.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In some cases, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

As indicated above, wireless communications system 100 may use a CP to provide a guard period at the start of each OFDMA symbol which provides protection against multipath delay spread. The CP may be generated by copying the end of the main body of the OFDMA symbol to a beginning of the OFDMA symbol, such that a frequency domain representation of each delay spread component within a fast Fourier transform (FFT) processing window is the same. Both an NCP and an ECP length may be specified in systems, with the NCP intended to be sufficient for the majority of scenarios and the ECP intended for scenarios with relatively high delay spread. In some aspects of the disclosure, as will be discussed in more detail below, a base station 105 may provide slot formats for NCP symbols, and ECP slot formats may be derived based on the NCP slot formats.

Figure 2:
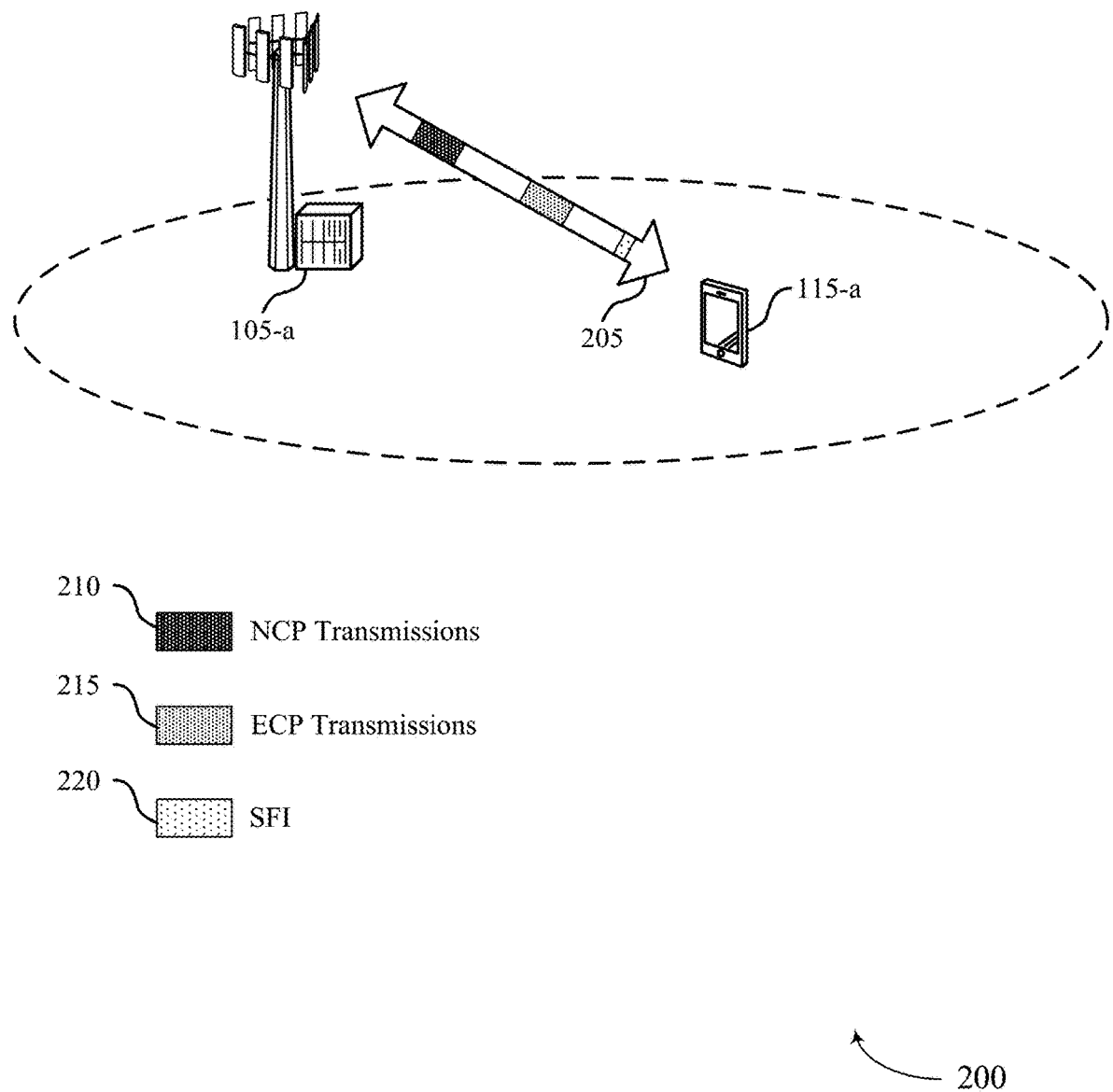
FIG. 2 illustrates an example of a portion of a wireless communications system that supports slot format determination for extended cyclic prefix transmissions using normal cyclic prefix slot formats in accordance with aspects of the present disclosure.

FIG. 2 illustrates an example of a portion of a wireless communications system 200 that supports slot format determination for extended cyclic prefix transmissions using normal cyclic prefix slot formats in accordance with various aspects of the present disclosure. In some examples, wireless communications system 200 may implement aspects of wireless communications system 100. For example, wireless communications system 200 includes UE 115-a and base station 105-a, which may be examples of the corresponding devices described with reference to FIG. 1. Wireless communications system 200 may support NCP and ECP transmissions, in which a slot format for ECP transmissions may be determined based on an NCP slot format.

In the example of FIG. 2, the base station 105-a and UE 115-a may establish a wireless connection 205. The wireless connection may support NCP transmissions 210, and ECP transmissions 215. As indicated above, in some NR systems, a number of different slot formats may be provided that identify transmission directions of different symbols within a slot. In some cases, a slot format may identify which symbols are uplink (U) symbols, which symbols are downlink (D) symbols, and which symbols are flexible (X) symbols that may contain no transmissions or downlink transmissions. In some cases, a SFI 220 may provide an indication of a particular slot format that is to be used, and may be provided for slots using NCP symbols. In some examples, the SFI 220 may be carried in a GC-PDCCH transmission, and may indicate single slot format or multi-slot format. In some cases, the base station 105-a and UE 115-a may determine an ECP slot format based on a NCP slot that is provided in the SFI 220.

In some cases, starting and ending times of each NCP symbol in a slot may be time domain mapped to starting and ending times of each ECP symbol in the slot. A transmission direction of each ECP symbol may be determined based at least in part on the transmission direction of at least a portion of at least one NCP symbol that fully or partially overlaps in the time domain with a corresponding ECP symbol. In some examples, different slot formats for NCP symbols are defined in a table with 14 columns, each corresponds to one NCP symbol out of 14 NCP symbols in a slot. Further, NCP symbols may have a sub-carrier spacing (SCS) that may be selected from a number of different available SCSs (e.g., 15 kHz, 30 kHz, 60 kHz, etc.), some or all of which may also support ECP symbols. In some cases, the reference SCS for the SFI may be equal to or smaller than a target bandwidth part (BWP) SCS. Various techniques provided herein may allow determination of a slot format for ECP symbols based on the signaled SFI and a slot format table that is defined for NCP symbols. An example of a slot format table for NCP symbols is illustrated in FIG. 3.

Figure 3:
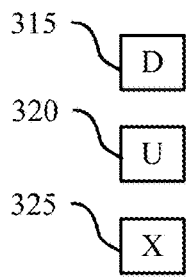
FIG. 3 illustrates an example of a slot format indicator table that supports slot format determination for extended cyclic prefix transmissions using normal cyclic prefix slot formats in accordance with aspects of the present disclosure.

FIG. 3 illustrates an example of a portion of a slot format table 300 that supports slot format determination for extended cyclic prefix transmissions using normal cyclic prefix slot formats in accordance with various aspects of the present disclosure. In some examples, slot format table 300 may be implemented aspects of wireless communications system 100 or 200. As indicated above, in some cases a SFI may indicate an entry in slot format table 300 that defines a slot format for transmissions between a base station and a UE (e.g., base stations 105 and UEs 115 of FIG. 1 or 2).

In the example of FIG. 3, slot format table may include a SFI ID column 305, which may include an index value for a SFI, and columns for each NCP symbol which may be indexed at a top row 310 as symbols 0 through 13. Each row of the slot format table 300 may include an indication for each NCP symbol that indicates whether the symbol is a downlink (D) symbol 315, an uplink (U) symbol 320, or a flexible (X) symbol 325. The example of FIG. 3 shows only a portion of such a table, and in some NR deployments the slot format table 300 may include 56 different slot formats. In some cases, the SFI may be an 8-bit indicator, and may support a slot format table 300 that contains up to 256 rows of different slot formats.

As indicated above, NR systems may support ECP for a number of different available SCSs, including for 30 kHz SCS and 60 kHz SCS. Furthermore, a reference SCS used for a SCI may be equal to or smaller than a target BWP SCS. When using NCP, a slot format for transmissions with a SCS that is different than the reference SCS may be determined by repeating the slot format indicated in the SFI a number of times. For example, if the reference SCS is 15 kHz and the SCS for the BWP is 30 kHz, the slot format of slot format table 300 may be repeated twice. Similarly, if the reference SCS is 15 kHz and the SCS for the BWP is 60 kHz, the slot format of slot format table 300 may be repeated four times.

However, if ECP is to be used for transmissions, providing separate slot format tables may result in a relatively large number of tables to determine slot formats for different CSs and SCSs. Furthermore, if some UEs 115 are using NCP and other UEs 115 are using ECP, a base station 105 would need to indicate separate SFI information for different UEs 115, and thus additional signaling would occur in such cases.

Thus, ECP slot format determination based on NCP slot formats as discussed in various aspects of the present disclosure provides for relatively efficient determination of ECP slot formats with relatively little additional overhead. In some cases, ECP slot formats may be determined based on removing two columns from the slot format table 300. For example, the last two columns may simply be removed, or two entries from the most dominant transmission direction may be removed (either based on the dominant transmission direction of all 14 symbols, or incrementally after each symbol that is removed). In such cases, in order to generate the ECP slot format for a different SCS than a reference SCS used for the SFI, the generated table may be repeated a number of times based on the multiple between the reference SCS and the ECP SCS (e.g., repeat the generated ECP slot format table twice if the reference SCS is 15 kHz and the ECP SCS is 30 kHz, repeat the generated ECP slot format table four times if the reference SCS is 15 kHz and the ECP SCS is 60 kHz, etc.). In other cases, as will be discussed in more detail below, ECP transmission direction may be determined based on time domain mapping between ECP symbols and NCP symbols.

Figure 4A:
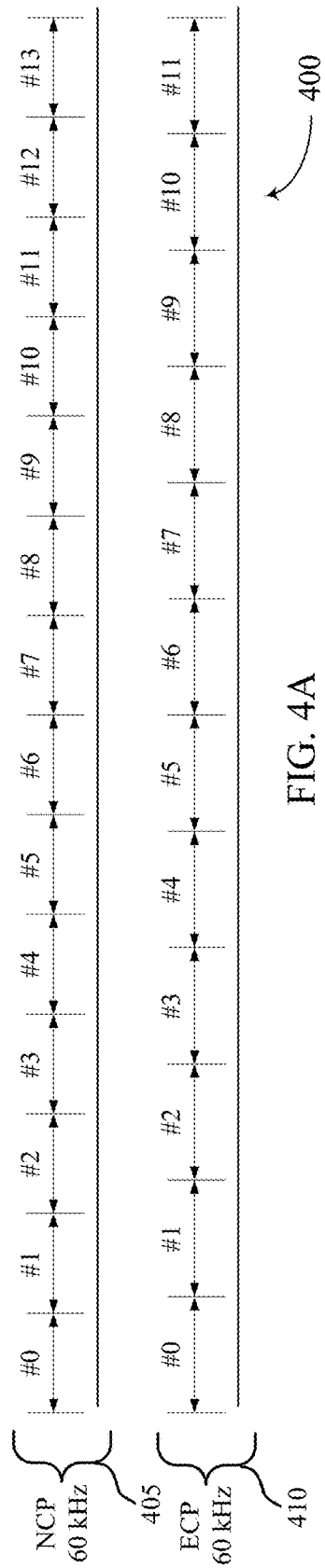
FIGS. 4A through 4C illustrate examples of time domain mapping that support slot format determination for extended cyclic prefix transmissions using normal cyclic prefix slot formats in accordance with aspects of the present disclosure.
Figure 4B:
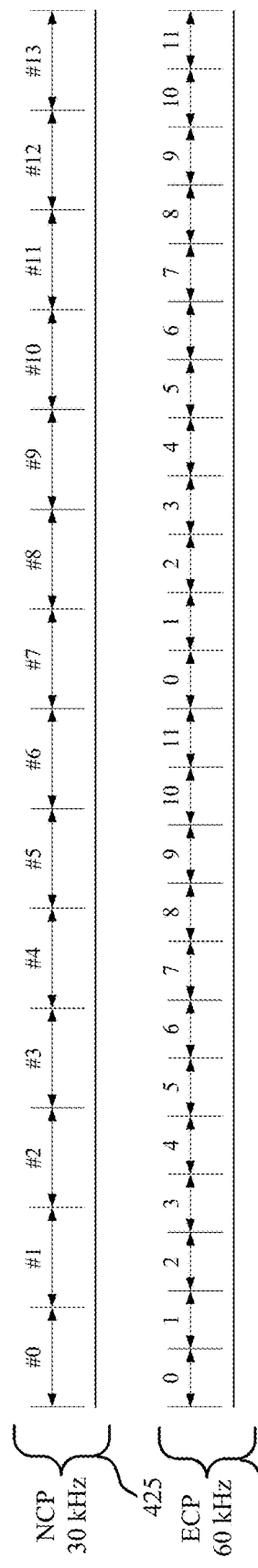
Figure 4C:
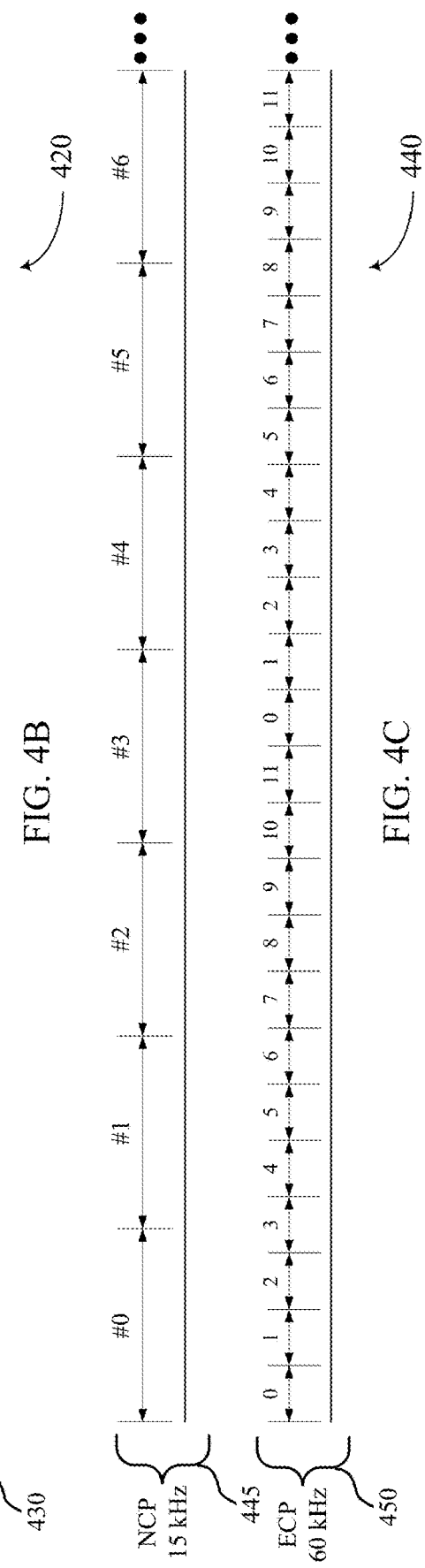

FIGS. 4A through 4C illustrate examples of time domain mappings 400, 420, and 440 that support slot format determination for extended cyclic prefix transmissions using normal cyclic prefix slot formats in accordance with aspects of the present disclosure. In some examples, time domain mappings 400, 420, and 440 may be implemented in aspects of wireless communications system 100 or 200.

As discussed above, in some cases, within a time domain range of an ECP symbol, transmission direction(s) of one or more corresponding NCP symbols are determined. In the example of FIG. 4A, time domain mapping 400 may provide that NCP 60 kHz symbols 405 may be identified in the time domain based on a reference SCS signaled in a SFI, and ECP transmissions at a 60 kHz SCS are to be transmitted. The ECP 60 kHz symbols 410 may be identified in the time domain, and starting and ending times of the ECP slots and NCP slots may be identified. Based on the time domain overlapping of all or a portion of an NCP slot, the transmission direction of the corresponding ECP slot may be determined. In some cases, as illustrated in the examples of FIGS. 5A, 5B, and 6, if any part of a fully or partially overlapping NCP symbol direction is X, as indicated by the NCP based SFI indication, the ECP symbol direction is determined to be X; and if the entire time domain range of the ECP symbol overlaps with only D or U direction NCP symbols, as indicated by the NCP based indication, the ECP symbol is D or U. In other cases, a rounding rule may be used, and a transmission direction of an ECP symbol may be determined based on whether a dominant portion of the time domain of an ECP symbol maps to a D, X, or U direction of fully or partially overlapping NCP symbols.

Furthermore, if different SCSs are used, the same rules may be applied based on the SFI and reference SCS. In the time domain mapping 420 of FIG. 4B, time domain mapping between 30 kHz NCP symbols 425 and 60 kHz ECP symbols 430 is illustrated. In such cases, the rules as discussed with respect to FIG. 4A may be used to determine transmission directions of the ECP symbols. Similarly, in the time domain mapping 440 of FIG. 4C, time domain mapping between 15 kHz NCP symbols 445 and 60 kHz ECP symbols 450 is illustrated for the first half of a slot (i.e., the first seven 15 kHz symbols), in which the second half of the slot would repeat. In such cases, the rules as discussed with respect to FIG. 4A again may be used to determine transmission directions of the ECP symbols.

Thus, instead of defining new tables for ECP symbols, or using an existing NCP table to derive an ECP table, such techniques directly use the NCP table for slot formats, and determine the ECP symbol direction (D or X or U) considering the indicated direction within the ECP symbol from NCP indication, which may be applied with the ECP and reference SCS are the same or different.

FIGS. 5A and 5B illustrate examples of slot formats 500 and 520 based on slot format determination for extended cyclic prefix transmissions using normal cyclic prefix slot formats in accordance with aspects of the present disclosure. In some examples, slot formats 500 and 520 may be implemented in aspects of wireless communications system 100 or 200.

In the example of FIG. 5A, time domain mapping and transmission direction rules may provide slot format 500, in which NCP 60 kHz symbols 505 may be identified in the time domain based on a reference SCS signaled in a SFI, and ECP transmissions at a 60 kHz SCS are to be transmitted. The ECP 60 kHz symbols 510 may be identified in the time domain, and starting and ending times of the ECP slots and NCP slots may be identified. Based on the time domain overlapping of all or a portion of an NCP slot, the transmission direction of the corresponding ECP slot may be determined. In the example of FIG. 5A, NCP symbols 0 and 1 may fully or partially overlap with ECP symbol 0, and both may have a downlink direction, and thus ECP symbol 0 may have a downlink direction. NCP symbols 2 and 3 may each partially overlap ECP symbol 3, and since one of the overlapping NCP symbols has a flexible direction, ECP symbol 2 has a flexible (X) direction. In some cases, a hierarchy of transmission directions may be established, and if one of the NCP symbols that overlaps an ECP symbol has a transmission direction that is higher in the hierarchy, the ECP symbol direction is set to be the higher order transmission direction. For example, an ordered set of transmission directions may be established with the flexible transmission direction having a highest order, uplink transmission direction having the lowest order, and downlink transmission direction in the middle. Thus, if two overlapping NCP symbols have a D and a U transmission direction, the mapped ECP symbol would be set to D.

As indicated above, the rules for ECP transmission direction may be applied when a reference SCS is different than an ECP SCS. In the slot format 520 of FIG. 5B, time domain mapping between 30 kHz NCP symbols 525 and 60 kHz ECP symbols 530 is illustrated. Based on the time domain overlapping of all or a portion of an NCP slot with a mapped ECP slot, the transmission direction of the corresponding ECP slot may be determined in a manner as discussed above with respect to FIG. 5A.

FIG. 6 illustrates an example of a slot format indicator table 600 that represents an example of slot format determinations for extended cyclic prefix transmissions using normal cyclic prefix slot formats in accordance with aspects of the present disclosure. In some examples, slot format indicator table 600 may be implemented in aspects of wireless communications system 100 or 200. In this example, the slot format indicator table 600 may be derived from a NCP slot format indicator table, the time domain mapping between NCP and ECP symbols, and the transmission direction rules as discussed with respect to FIGS. 4 and 5. As can be observed, there are duplicate entries in the table 600, which result from the mapping and direction determination. In some cases, a slot format indicator table 600 is not provided to or derived at a UE 115 or a base station 105, as the rules as discussed above may be implemented to determine a slot format for a slot with ECP symbols, and an example table is illustrated to show what slot format index (first column) means for 60 kHz ECP when the slot formats are defined with 60 kHz reference SCS for NCP. Other tables could be similarly derived for other SCS combinations.

Figure 7A:
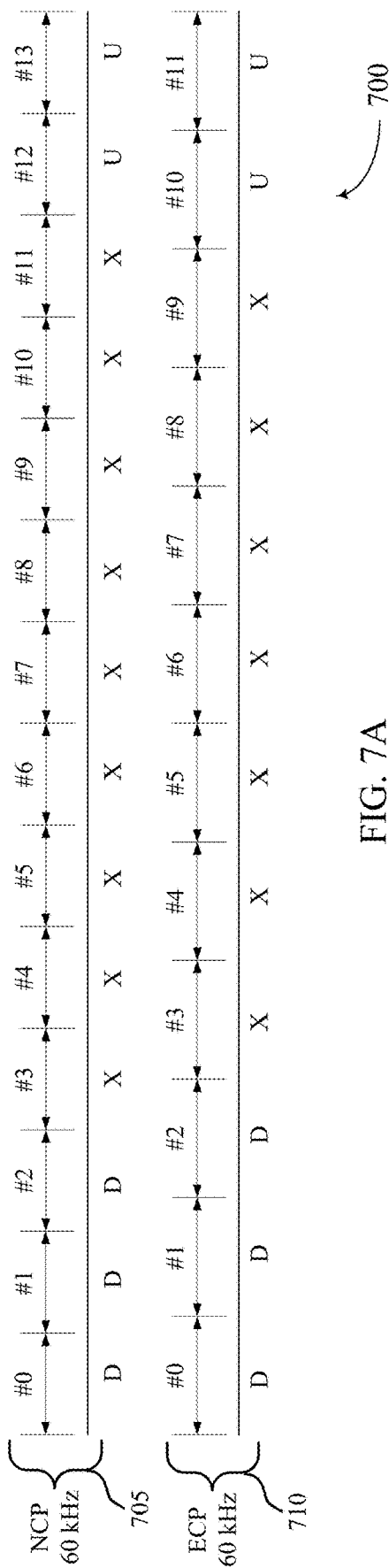
FIGS. 7A and 7B illustrate further examples of slot format determination for extended cyclic prefix transmissions using normal cyclic prefix slot formats in accordance with aspects of the present disclosure.
Figure 7B:
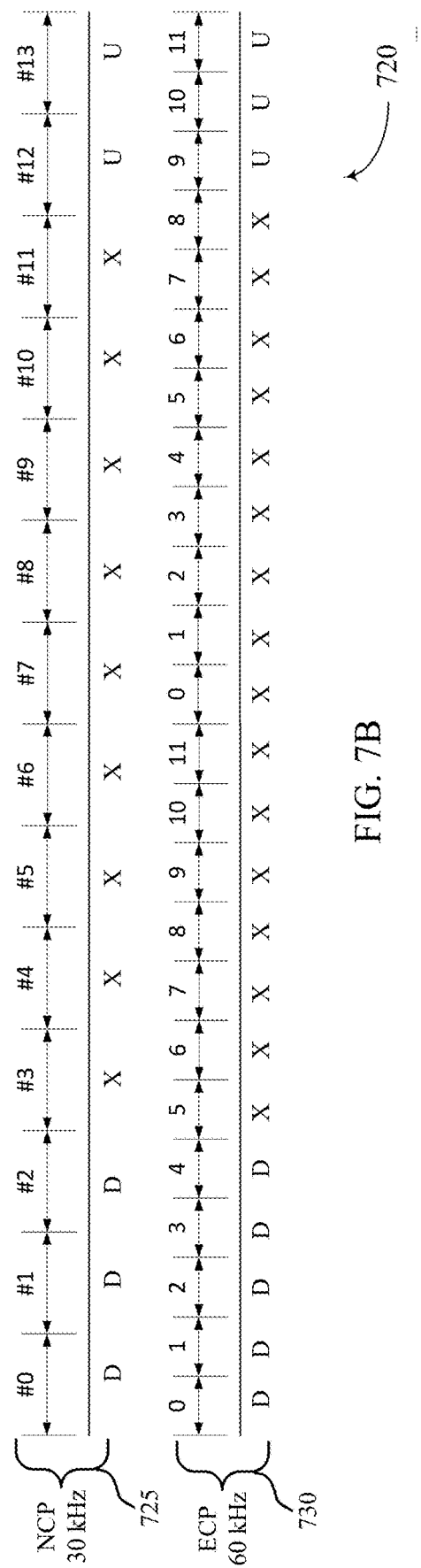

FIGS. 7A and 7B illustrate examples of slot formats 700 and 720 based on slot format determination for extended cyclic prefix transmissions using normal cyclic prefix slot formats in accordance with aspects of the present disclosure. In some examples, slot formats 700 and 720 may be implemented in aspects of wireless communications system 100 or 200.

In the example of FIG. 7A, time domain mapping and transmission direction rules may provide slot format 700 in which NCP 60 kHz symbols 705 may be identified in the time domain based on a reference SCS signaled in a SFI, and ECP transmissions at a 60 kHz SCS are to be transmitted. The ECP 60 kHz symbols 710 may be identified in the time domain, and starting and ending times of the ECP slots and NCP slots may be identified. Based on the time domain overlapping of all or a portion of an NCP slot, the transmission direction of the corresponding ECP slot may be determined. In the example of FIG. 7A, NCP symbols 0 and 1 may fully or partially overlap with ECP symbol 0, and both may have a downlink direction, and thus ECP symbol 0 may have a downlink direction. NCP symbols 2 and 3 may each partially overlap ECP symbol 3, and may have different transmission directions. In this example, since NCP symbol 2 overlaps with a larger time domain portion of ECP symbol 2 than NCP symbol 3, the transmission direction of NCP symbol 2 (D) is used for the transmission direction of ECP symbol 2. As indicated above, the rules for ECP transmission direction may be applied when a reference SCS is different than an ECP SCS. In the time slot format 720 of FIG. 7B, time domain mapping between 30 kHz NCP symbols 725 and 60 kHz ECP symbols 730 is illustrated. Based on the time domain overlapping of all or a portion of an NCP slot with a mapped ECP slot, the transmission direction of the corresponding ECP slot may be determined in a manner as discussed above with respect to FIG. 7A.

FIG. 8 illustrates an example of a slot format indicator table 800 that represents an example of slot format determinations for extended cyclic prefix transmissions using normal cyclic prefix slot formats in accordance with aspects of the present disclosure. In some examples, slot format indicator table 800 may be implemented in aspects of wireless communications system 100 or 200. In this example, the slot format indicator table 800 may be derived from a NCP slot format indicator table, the time domain mapping between NCP and ECP symbols, and the transmission direction rules as discussed with respect to FIG. 6. As can be observed, there are duplicate entries in the table 800, which result from the mapping and direction determination based on the dominant time domain direction of overlapping NCP symbol(s). In some cases, a slot format indicator table 800 is not provided to or derived at a UE 115 or a base station 105, as the rules as discussed above may be implemented to determine a slot format for a slot with ECP symbols, and an example table is illustrated to show what slot format index (first column) means for 60 kHz ECP when the slot formats are defined with 80 kHz reference SCS for NCP. Other tables could be similarly derived for other SCS combinations.

Figure 9:
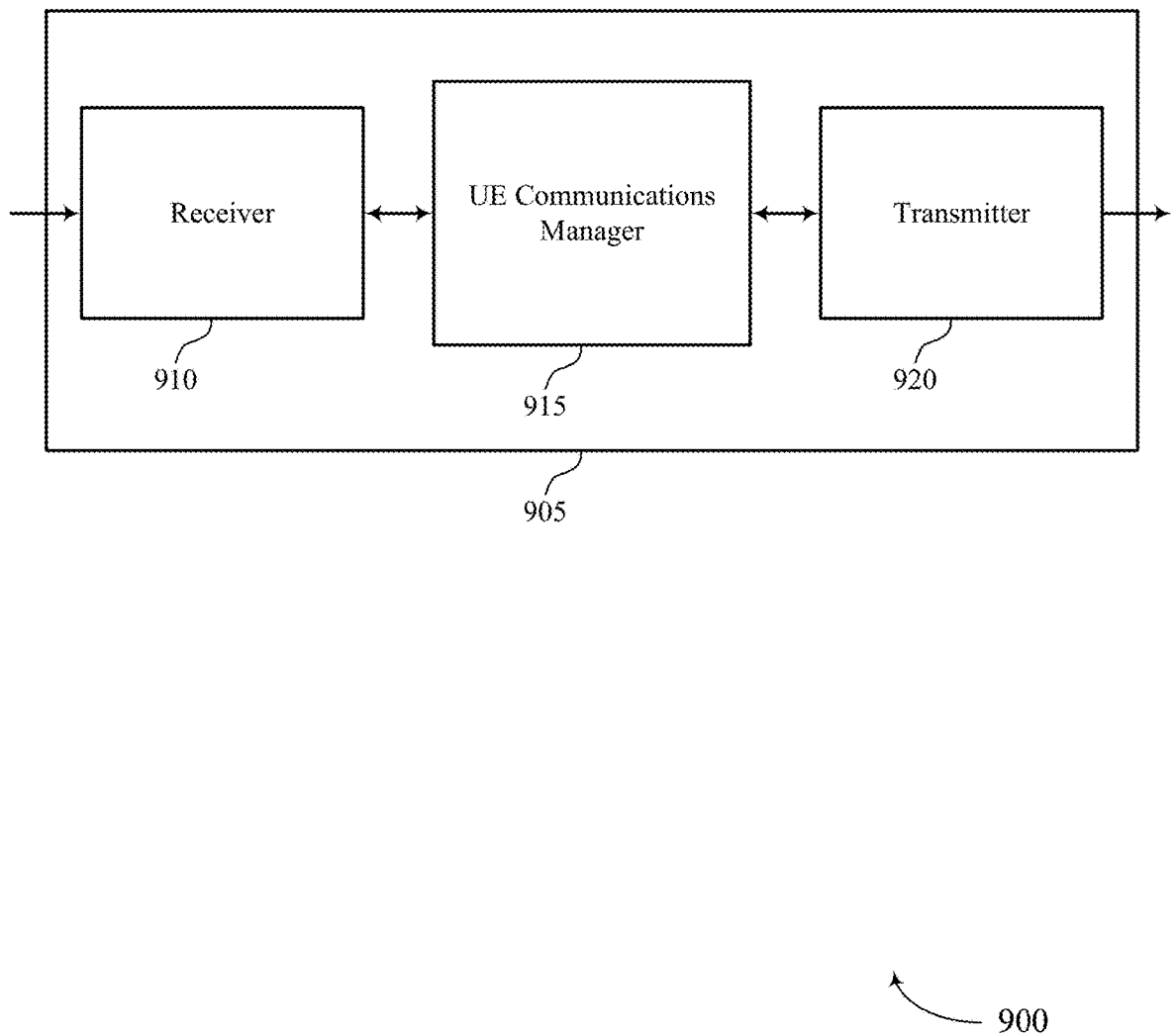
FIGS. 9 through 11 show block diagrams of a device that supports slot format determination for extended cyclic prefix transmissions using normal cyclic prefix slot formats in accordance with aspects of the present disclosure.

FIG. 9 shows a block diagram 900 of a wireless device 905 that supports slot format determination for extended cyclic prefix transmissions using normal cyclic prefix slot formats in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to slot format determination for extended cyclic prefix transmissions using normal cyclic prefix slot formats, etc.). Information may be passed on to other components of the device 905. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may identify a slot format for normal cyclic prefix (NCP) transmissions between the UE and a base station, the slot format indicating a transmission direction for each NCP symbol of a set of NCP symbols within a slot, map, using a time domain comparison of the starting and ending time of each NCP symbol and each extended cyclic prefix (ECP) symbol of a set of ECP symbols, the set of NCP symbols to the set of ECP symbols, where the set of ECP symbols each have a larger cyclic prefix than the NCP symbols, and determine, based at least in part on the transmission direction of at least a portion of at least one NCP symbol that fully or partially overlaps in the time domain with a corresponding ECP symbol, a transmission direction of the corresponding ECP symbol. In some examples, UE communications manager 915 may identify a slot format for NCP transmissions between the UE and a base station, the slot format indicating a transmission direction for each NCP symbol of a set of NCP symbols within a slot, and determine, based at least in part on the transmission direction of at least a portion of at least one NCP symbol that fully or partially overlaps in the time domain with a corresponding ECP symbol, a transmission direction of the corresponding ECP symbol, where a starting and ending time of each NCP symbol is mapped to each ECP symbol of a set of ECP symbols in the time domain.

Transmitter 920 may transmit signals generated by other components of the device 905. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
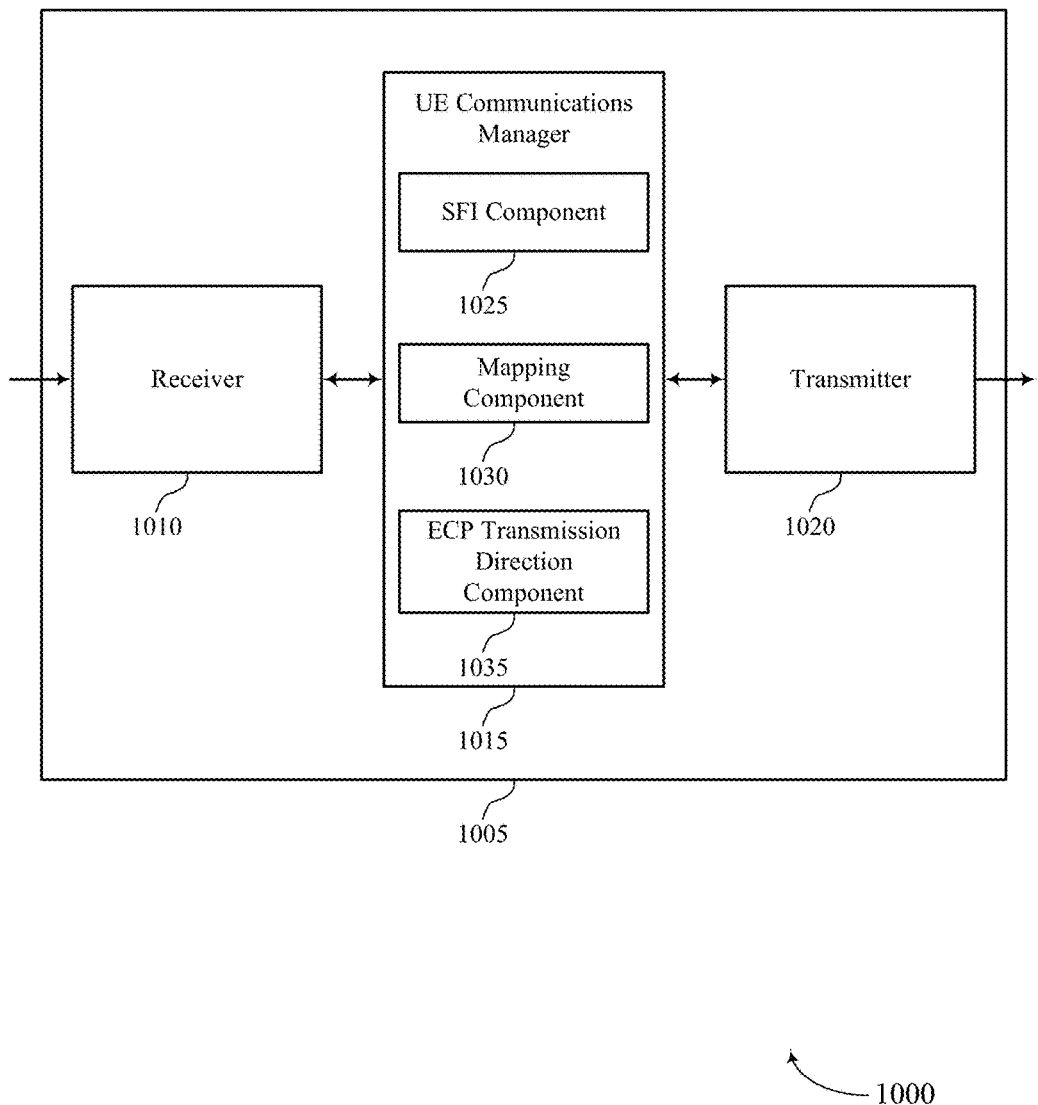

FIG. 10 shows a block diagram 1000 of a wireless device 1005 that supports slot format determination for extended cyclic prefix transmissions using normal cyclic prefix slot formats in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to slot format determination for extended cyclic prefix transmissions using normal cyclic prefix slot formats, etc.). Information may be passed on to other components of the device 1005. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12.

UE communications manager 1015 may also include SFI component 1025, mapping component 1030, and ECP transmission direction component 1035.

SFI component 1025 may identify a slot format for normal cyclic prefix (NCP) transmissions between the UE 115 and a base station 105, the slot format indicating a transmission direction for each NCP symbol of a set of NCP symbols within a slot. In some cases, the slot format is based on a reference sub-carrier spacing (SCS) for the NCP transmissions, and where the ECP symbols have a different SCS than the reference SCS. In some cases, the slot format is identified based on a group common physical downlink control channel (GC-physical downlink control channel (PDCCH)) transmission received from the base station.

Mapping component 1030 may map, using a time domain comparison of the starting and ending time of each NCP symbol and each extended cyclic prefix (ECP) symbol of a set of ECP symbols, the set of NCP symbols to the set of ECP symbols, where the set of ECP symbols each have a larger cyclic prefix than the NCP symbols and identify, based on the mapping, a subset of the NCP symbols that fully or partially overlap in the time domain with a first ECP symbol of the set of ECP symbols.

ECP transmission direction component 1035 may determine, based at least in part on the transmission direction of at least a portion of at least one NCP symbol that fully or partially overlaps in the time domain with a corresponding ECP symbol, a transmission direction of the corresponding ECP symbol. In some cases, ECP transmission direction component 1035 may determine the transmission direction of the first ECP symbol based on a highest ordered transmission direction of the ordered set of transmission directions within the subset of the NCP symbols. In some cases, the determining includes identifying, based on the mapping, a subset of the NCP symbols that overlap in the time domain with a first ECP symbol of the set of ECP symbols, and determining that the first ECP symbol has a flexible transmission direction when at least one of the NCP symbols of the subset of the NCP symbols has a flexible transmission direction. In some cases, the determining further includes determining that the first ECP symbol has an uplink transmission direction when each of the NCP symbols of the subset of the NCP symbols has an uplink transmission direction, and determining that the first ECP symbol has a downlink transmission direction when each of the NCP symbols of the subset of the NCP symbols has a downlink transmission direction. In some cases, the determining includes identifying, based on the mapping, a subset of the NCP symbols that fully or partially overlap in the time domain with a first ECP symbol of the set of ECP symbols, determining one or more portions in the time domain of the first ECP symbol that correspond to one or more NCP symbols, or portions thereof, of the subset of the NCP symbols, and determining that the first ECP symbol transmission direction corresponds to the NCP symbol transmission direction of a longest of the one or more portions in the time domain of the first ECP symbol.

Transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
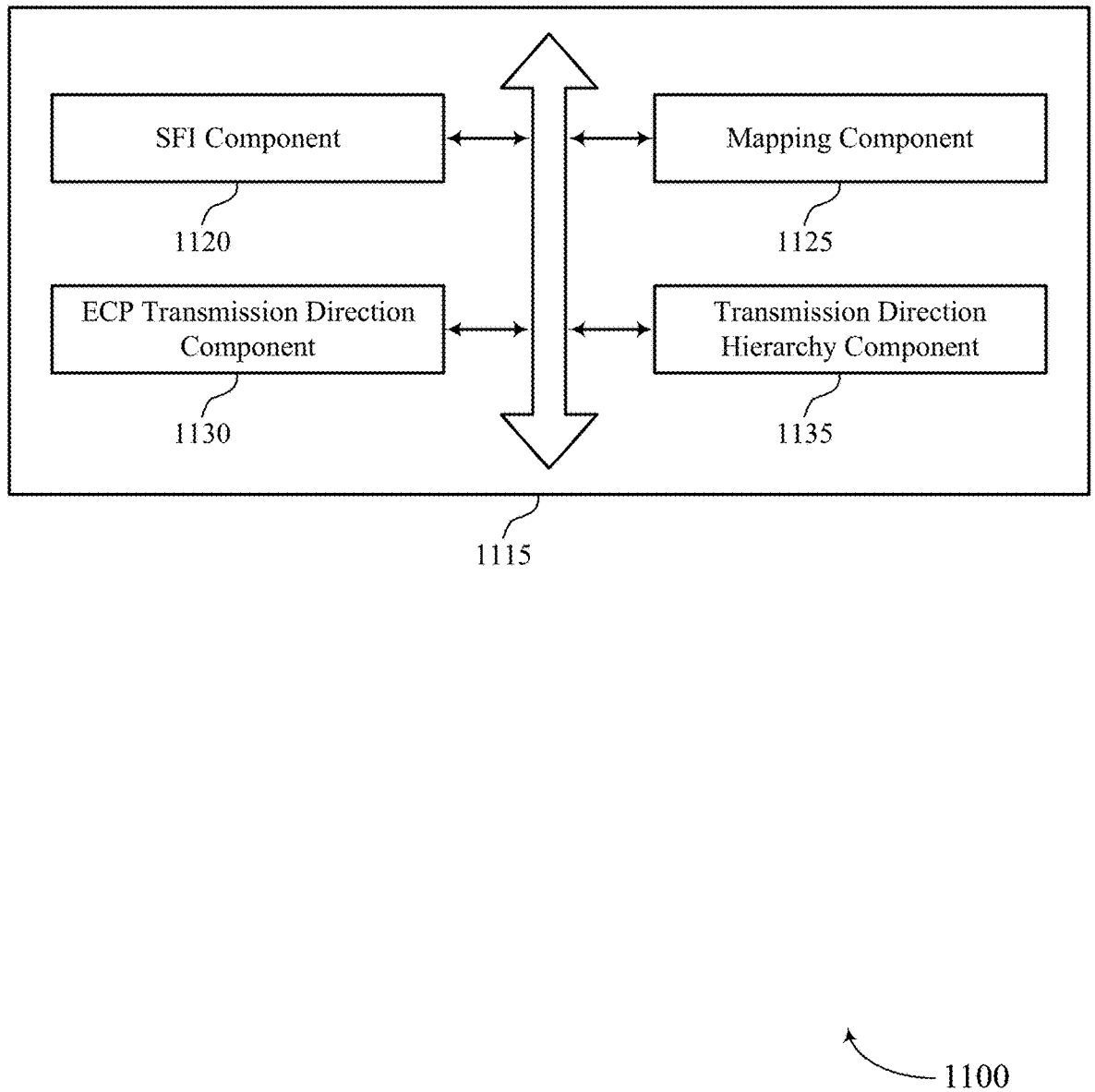

FIG. 11 shows a block diagram 1100 of a UE communications manager 1115 that supports slot format determination for extended cyclic prefix transmissions using normal cyclic prefix slot formats in accordance with aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include SFI component 1120, mapping component 1125, ECP transmission direction component 1130, and transmission direction hierarchy component 1135. Each of these modules may communicate, directly or indirectly, with one another (e.g., via one or more buses).

SFI component 1120 may identify a slot format for normal cyclic prefix (NCP) transmissions between the UE 115 and a base station 105, the slot format indicating a transmission direction for each NCP symbol of a set of NCP symbols within a slot. In some cases, the slot format is based on a reference sub-carrier spacing (SCS) for the NCP transmissions, and where the ECP symbols have a different SCS than the reference SCS. In some cases, the slot format is identified based on a group common physical downlink control channel (GC-physical downlink control channel (PDCCH)) transmission received from the base station.

Mapping component 1125 may map, using a time domain comparison of the starting and ending time of each NCP symbol and each extended cyclic prefix (ECP) symbol of a set of ECP symbols, the set of NCP symbols to the set of ECP symbols, where the set of ECP symbols each have a larger cyclic prefix than the NCP symbols and identify, based on the mapping, a subset of the NCP symbols that fully or partially overlap in the time domain with a first ECP symbol of the set of ECP symbols.

ECP transmission direction component 1130 may determine, based at least in part on the transmission direction of at least a portion of at least one NCP symbol that fully or partially overlaps in the time domain with a corresponding ECP symbol, a transmission direction of the corresponding ECP symbol. In some cases, ECP transmission direction component 1130 may determine the transmission direction of the first ECP symbol based on a highest ordered transmission direction of the ordered set of transmission directions within the subset of the NCP symbols. In some cases, the determining includes identifying, based on the mapping, a subset of the NCP symbols that overlap in the time domain with a first ECP symbol of the set of ECP symbols, and determining that the first ECP symbol has a flexible transmission direction when at least one of the NCP symbols of the subset of the NCP symbols has a flexible transmission direction. In some cases, the determining further includes determining that the first ECP symbol has an uplink transmission direction when each of the NCP symbols of the subset of the NCP symbols has an uplink transmission direction, and determining that the first ECP symbol has a downlink transmission direction when each of the NCP symbols of the subset of the NCP symbols has a downlink transmission direction. In some cases, the determining includes identifying, based on the mapping, a subset of the NCP symbols that fully or partially overlap in the time domain with a first ECP symbol of the set of ECP symbols, determining one or more portions in the time domain of the first ECP symbol that correspond to one or more NCP symbols, or portions thereof, of the subset of the NCP symbols, and determining that the first ECP symbol transmission direction corresponds to the NCP symbol transmission direction of a longest of the one or more portions in the time domain of the first ECP symbol.

Transmission direction hierarchy component 1135 may identify an ordered set of transmission directions. In some cases, the transmission direction indicates that an ECP symbol has an uplink transmission direction, a downlink transmission direction, or a flexible transmission direction, and where the flexible transmission direction has a highest ordered transmission direction in the ordered set of transmission directions, the downlink transmission direction has a middle ordered transmission direction in the ordered set of transmission directions, and the uplink transmission direction has a lowest ordered transmission direction in the ordered set of transmission directions.

Figure 12:
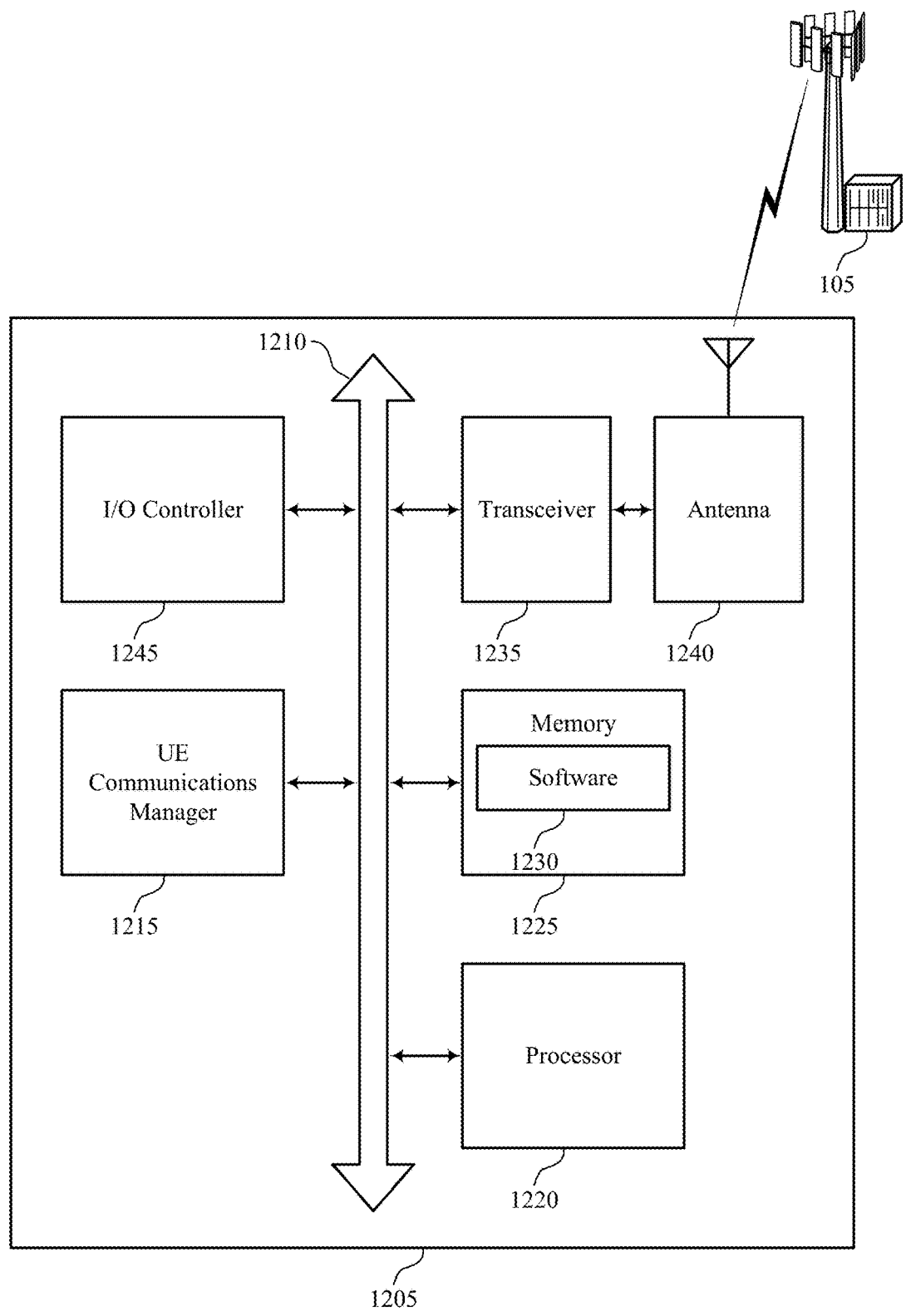
FIG. 12 illustrates a block diagram of a system including a UE that supports slot format determination for extended cyclic prefix transmissions using normal cyclic prefix slot formats in accordance with aspects of the present disclosure.

FIG. 12 shows a diagram of a system 1200 including a device 1205 that supports slot format determination for extended cyclic prefix transmissions using normal cyclic prefix slot formats in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting slot format determination for extended cyclic prefix transmissions using normal cyclic prefix slot formats).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support slot format determination for extended cyclic prefix transmissions using normal cyclic prefix slot formats. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device 1205 may include a single antenna 1240. However, in some cases the device 1205 may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
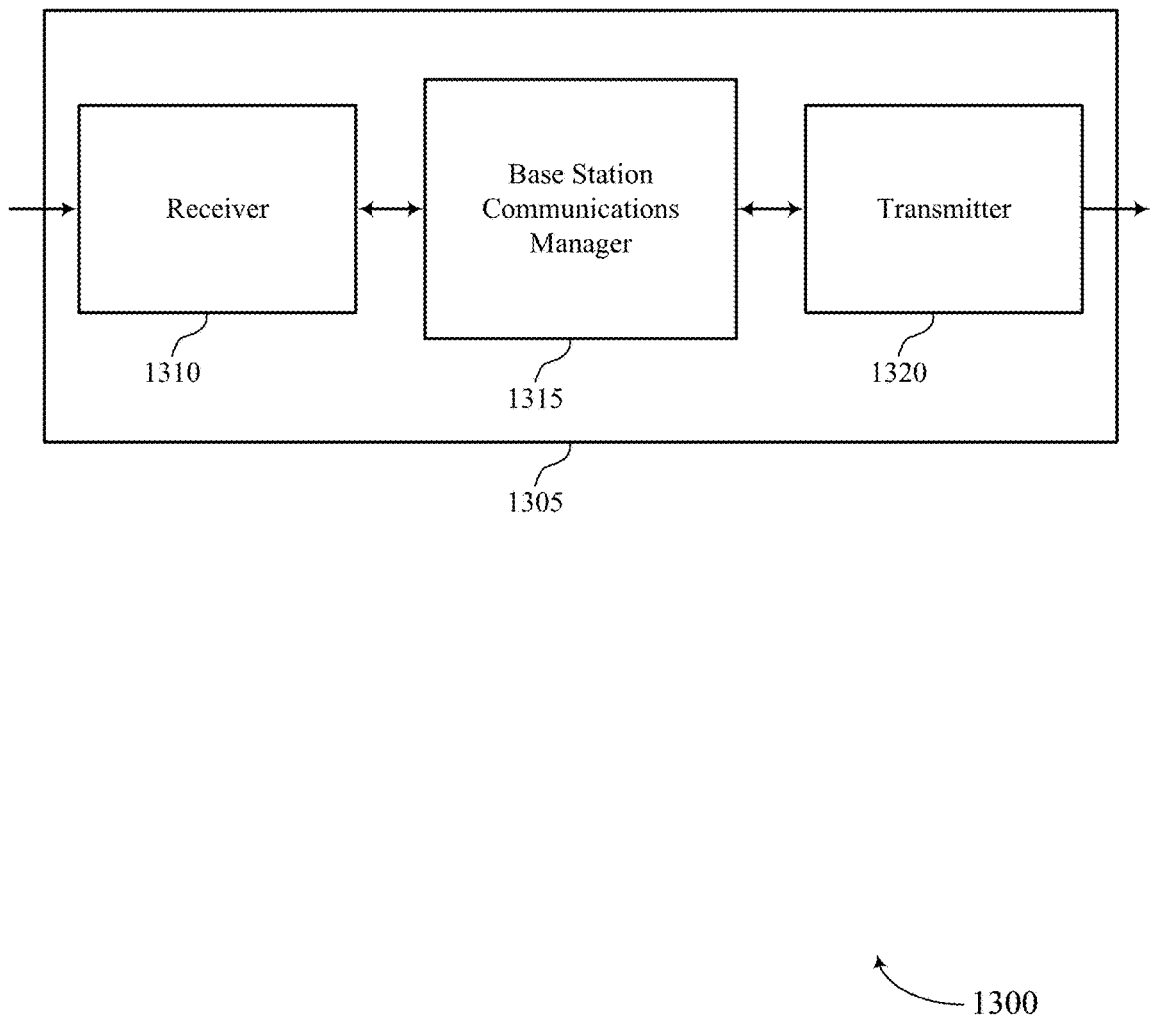
FIGS. 13 through 15 show block diagrams of a device that supports slot format determination for extended cyclic prefix transmissions using normal cyclic prefix slot formats in accordance with aspects of the present disclosure.

FIG. 13 shows a block diagram 1300 of a wireless device 1305 that supports slot format determination for extended cyclic prefix transmissions using normal cyclic prefix slot formats in accordance with aspects of the present disclosure.

Wireless device 1305 may be an example of aspects of a base station 105 as described herein. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to slot format determination for extended cyclic prefix transmissions using normal cyclic prefix slot formats, etc.). Information may be passed on to other components of the device 1305. The receiver 1310 may be an example of aspects of the transceiver 1635 described with reference to FIG. 16. The receiver 1310 may utilize a single antenna or a set of antennas.

Base station communications manager 1315 may be an example of aspects of the base station communications manager 1615 described with reference to FIG. 16.

Base station communications manager 1315 and/or at least some of its various sub-components may be implemented in hardware, software executed by a processor, firmware, or any combination thereof. If implemented in software executed by a processor, the functions of the base station communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1315 and/or at least some of its various sub-components may be physically located at various positions, including being distributed such that portions of functions are implemented at different physical locations by one or more physical devices. In some examples, base station communications manager 1315 and/or at least some of its various sub-components may be a separate and distinct component in accordance with various aspects of the present disclosure. In other examples, base station communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1315 may identify a slot format for normal cyclic prefix (NCP) transmissions between a UE 115 and the base station 105, the slot format indicating a transmission direction for each NCP symbol of a set of NCP symbols within a slot, transmit an indication of the slot format to the UE 115, map, using a time domain comparison of the starting and ending time of each NCP symbol and each extended cyclic prefix (ECP) symbol of a set of ECP symbols, the set of NCP symbols to the set of ECP symbols, where the set of ECP symbols each have a larger cyclic prefix than the NCP symbols, and determine, based at least in part on the transmission direction of at least a portion of at least one NCP symbol that fully or partially overlaps in the time domain with a corresponding ECP symbol, a transmission direction of the corresponding ECP symbol. In some examples, base station communications manager 1315 may identify a slot format for NCP transmissions between a UE 115 and the base station 105, the slot format indicating a transmission direction for each NCP symbol of a set of NCP symbols within a slot, transmit an indication of the slot format to the UE 115, configure the UE to determine, based at least in part on the transmission direction of at least a portion of at least one NCP symbol that fully or partially overlaps in the time domain with a corresponding ECP symbol, a transmission direction of the corresponding ECP symbol, where a starting and ending time of each NCP symbol is mapped to each ECP symbol of a set of ECP symbols in the time domain, and communicate with the UE 115 based at least in part on the determining. In some aspects, base station communications manager 1315 may configure the UE 115 to identify a subset of the NCP symbols that overlap in the time domain with a first ECP symbol of the set of ECP symbols, and determine that the first ECP symbol has a flexible transmission direction when at least one of the NCP symbols of the subset of the NCP symbols has a flexible transmission direction. In some aspects, base station communications manager 1315 may configure the UE 115 to determine that the first ECP symbol has an uplink transmission direction when each of the NCP symbols of the subset of the NCP symbols has an uplink transmission direction and the first ECP symbol has a downlink transmission direction when each of the NCP symbols of the subset of the NCP symbols has a downlink transmission direction. In some aspects, base station communications manager 1315 may configure the UE 115 identify an ordered set of transmission directions, identify a subset of the NCP symbols that fully or partially overlap in the time domain with a first ECP symbol of the second set of ECP symbols, and determine the transmission direction of the first ECP symbol based on a highest ordered transmission direction of the ordered set of transmission directions within the subset of the NCP symbols. In some aspects, base station communications manager 1315 may configure the UE 115 to identify a subset of the NCP symbols that fully or partially overlap in the time domain with a first ECP symbol of the second set of ECP symbols, determine one or more portions of the time domain of the first ECP symbol that correspond to one or more NCP symbols, or portions thereof, of the subset of the NCP symbols, and determine that the first ECP symbol transmission direction corresponds to the NCP symbol transmission direction of a longest of the one or more portions of the time domain of the first ECP symbol.

Transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Transmitter 1320 may transmit one or more ECP symbols to the UE 115 based on the determining.

Figure 14:
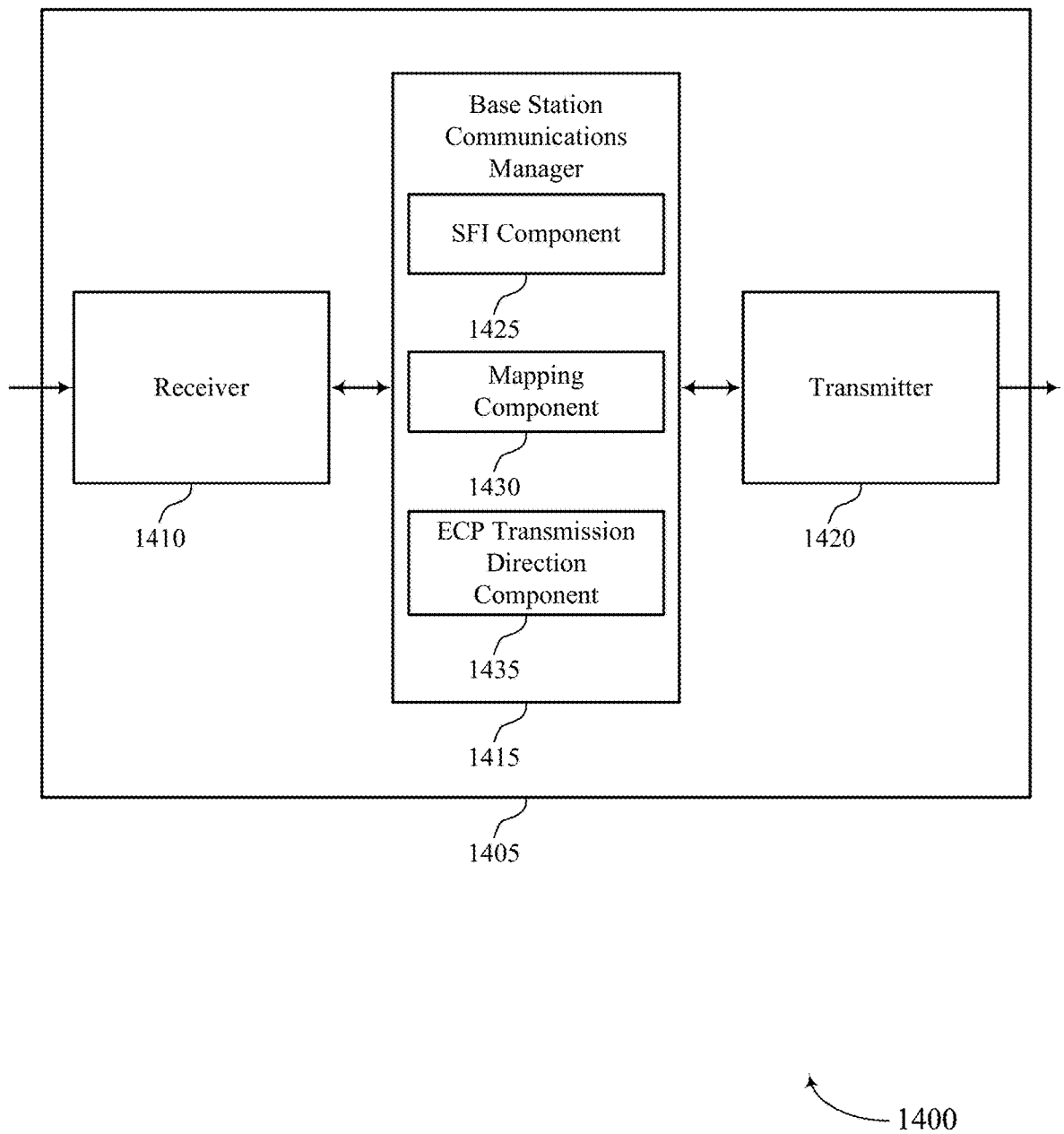

FIG. 14 shows a block diagram 1400 of a wireless device 1405 that supports slot format determination for extended cyclic prefix transmissions using normal cyclic prefix slot formats in accordance with aspects of the present disclosure. Wireless device 1405 may be an example of aspects of a wireless device 1305 or a base station 105 as described with reference to FIG. 13. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to slot format determination for extended cyclic prefix transmissions using normal cyclic prefix slot formats, etc.). Information may be passed on to other components of the device 1405. The receiver 1410 may be an example of aspects of the transceiver 1635 described with reference to FIG. 16. The receiver 1410 may utilize a single antenna or a set of antennas.

Base station communications manager 1415 may be an example of aspects of the base station communications manager 1615 described with reference to FIG. 16. Base station communications manager 1415 may also include SFI component 1425, mapping component 1430, and ECP transmission direction component 1435.

SFI component 1425 may identify a slot format for normal cyclic prefix (NCP) transmissions between a UE 115 and the base station 105, the slot format indicating a transmission direction for each NCP symbol of a set of NCP symbols within a slot and transmit an indication of the slot format to the UE. In some cases, the slot format is based on a reference sub-carrier spacing (SCS) for the NCP transmissions, and where the ECP symbols have a different SCS than the reference SCS. In some cases, the slot format is identified based on a group common physical downlink control channel (GC-PDCCH) transmission received from the base station.

Mapping component 1430 may map, using a time domain comparison of the starting and ending time of each NCP symbol and each extended cyclic prefix (ECP) symbol of a set of ECP symbols, the set of NCP symbols to the set of ECP symbols, where the set of ECP symbols each have a larger cyclic prefix than the NCP symbols and identify, based on the mapping, a subset of the NCP symbols that fully or partially overlap in the time domain with a first ECP symbol of the set of ECP symbols.

ECP transmission direction component 1435 may determine, based at least in part on the transmission direction of at least a portion of at least one NCP symbol that fully or partially overlaps in the time domain with a corresponding ECP symbol, a transmission direction of the corresponding ECP symbol. In some cases, ECP transmission direction component 1435 may determine the transmission direction of the first ECP symbol based on a highest ordered transmission direction of the ordered set of transmission directions within the subset of the NCP symbols. In some cases, the determining includes identifying, based on the mapping, a subset of the NCP symbols that overlap in the time domain with a first ECP symbol of the set of ECP symbols, and determining that the first ECP symbol has a flexible transmission direction when at least one of the NCP symbols of the subset of the NCP symbols has a flexible transmission direction. In some cases, the determining further includes determining that the first ECP symbol has an uplink transmission direction when each of the NCP symbols of the subset of the NCP symbols has an uplink transmission direction, and determining that the first ECP symbol has a downlink transmission direction when each of the NCP symbols of the subset of the NCP symbols has a downlink transmission direction. In some cases, the determining includes identifying, based on the mapping, a subset of the NCP symbols that fully or partially overlap in the time domain with a first ECP symbol of the set of ECP symbols, determining one or more portions of the time domain of the first ECP symbol that correspond to one or more NCP symbols, or portions thereof, of the subset of the NCP symbols, and determining that the first ECP symbol transmission direction corresponds to the NCP symbol transmission direction of a longest of the one or more portions of the time domain of the first ECP symbol.

Transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
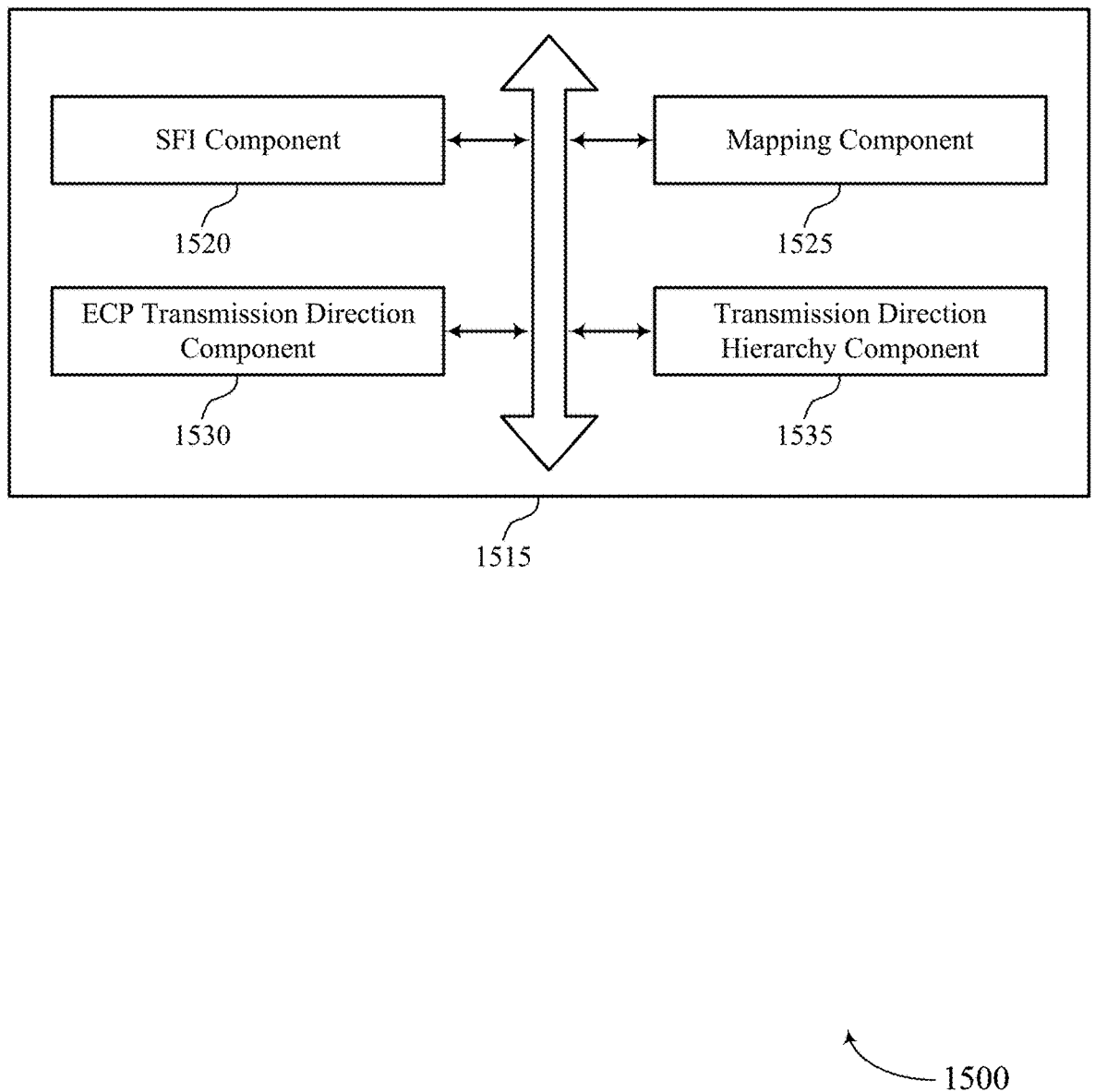

FIG. 15 shows a block diagram 1500 of a base station communications manager 1515 that supports slot format determination for extended cyclic prefix transmissions using normal cyclic prefix slot formats in accordance with aspects of the present disclosure. The base station communications manager 1515 may be an example of aspects of a base station communications manager 1615 described with reference to FIGS. 13, 14, and 16. The base station communications manager 1515 may include SFI component 1520, mapping component 1525, ECP transmission direction component 1530, and transmission direction hierarchy component 1535. Each of these modules may communicate, directly or indirectly, with one another (e.g., via one or more buses).

SFI component 1520 may identify a slot format for normal cyclic prefix (NCP) transmissions between a UE 115 and the base station 105, the slot format indicating a transmission direction for each NCP symbol of a set of NCP symbols within a slot and transmit an indication of the slot format to the UE 115. In some cases, the slot format is based on a reference sub-carrier spacing (SCS) for the NCP transmissions, and where the ECP symbols have a different SCS than the reference SCS. In some cases, the slot format is identified based on a group common physical downlink control channel (GC-PDCCH) transmission received from the base station.

Mapping component 1525 may map, using a time domain comparison of the starting and ending time of each NCP symbol and each extended cyclic prefix (ECP) symbol of a set of ECP symbols, the set of NCP symbols to the set of ECP symbols, where the set of ECP symbols each have a larger cyclic prefix than the NCP symbols and identify, based on the mapping, a subset of the NCP symbols that fully or partially overlap in the time domain with a first ECP symbol of the set of ECP symbols.

ECP transmission direction component 1530 may determine, based at least in part on the transmission direction of at least a portion of at least one NCP symbol that fully or partially overlaps in the time domain with a corresponding ECP symbol, a transmission direction of the corresponding ECP symbol. In some cases, ECP transmission direction component 1530 may determine the transmission direction of the first ECP symbol based on a highest ordered transmission direction of the ordered set of transmission directions within the subset of the NCP symbols. In some cases, the determining includes identifying, based on the mapping, a subset of the NCP symbols that overlap in the time domain with a first ECP symbol of the set of ECP symbols, and determining that the first ECP symbol has a flexible transmission direction when at least one of the NCP symbols of the subset of the NCP symbols has a flexible transmission direction. In some cases, the determining further includes determining that the first ECP symbol has an uplink transmission direction when each of the NCP symbols of the subset of the NCP symbols has an uplink transmission direction, and determining that the first ECP symbol has a downlink transmission direction when each of the NCP symbols of the subset of the NCP symbols has a downlink transmission direction. In some cases, the determining includes identifying, based on the mapping, a subset of the NCP symbols that fully or partially overlap in the time domain with a first ECP symbol of the set of ECP symbols, determining one or more portions of the time domain of the first ECP symbol that correspond to one or more NCP symbols, or portions thereof, of the subset of the NCP symbols, and determining that the first ECP symbol transmission direction corresponds to the NCP symbol transmission direction of a longest of the one or more portions of the time domain of the first ECP symbol.

Transmission direction hierarchy component 1535 may identify an ordered set of transmission directions. In some cases, the transmission direction indicates that an ECP symbol has an uplink transmission direction, a downlink transmission direction, or a flexible transmission direction, and where the flexible transmission direction has a highest ordered transmission direction in the ordered set of transmission directions, the downlink transmission direction has a middle ordered transmission direction in the ordered set of transmission directions, and the uplink transmission direction has a lowest ordered transmission direction in the ordered set of transmission directions.

Figure 16:
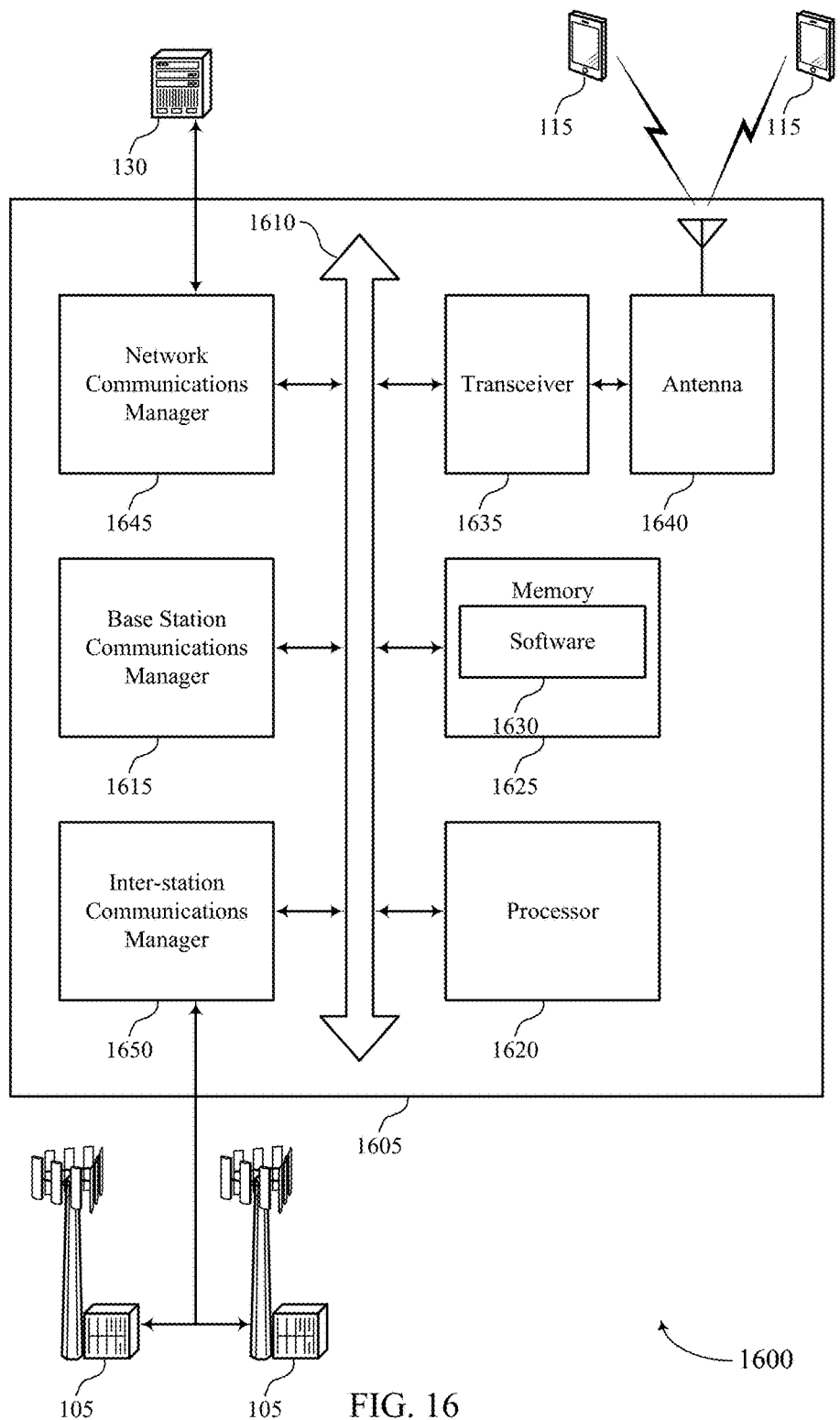
FIG. 16 illustrates a block diagram of a system including a base station that supports slot format determination for extended cyclic prefix transmissions using normal cyclic prefix slot formats in accordance with aspects of the present disclosure.

FIG. 16 shows a diagram of a system 1600 including a device 1605 that supports slot format determination for extended cyclic prefix transmissions using normal cyclic prefix slot formats in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting slot format determination for extended cyclic prefix transmissions using normal cyclic prefix slot formats).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support slot format determination for extended cyclic prefix transmissions using normal cyclic prefix slot formats. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device 1605 may include a single antenna 1640. However, in some cases the device 1605 may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an Long Term Evolution (LTE)/LTE-A wireless communication network technology to provide communication between base stations 105.

Figure 17:
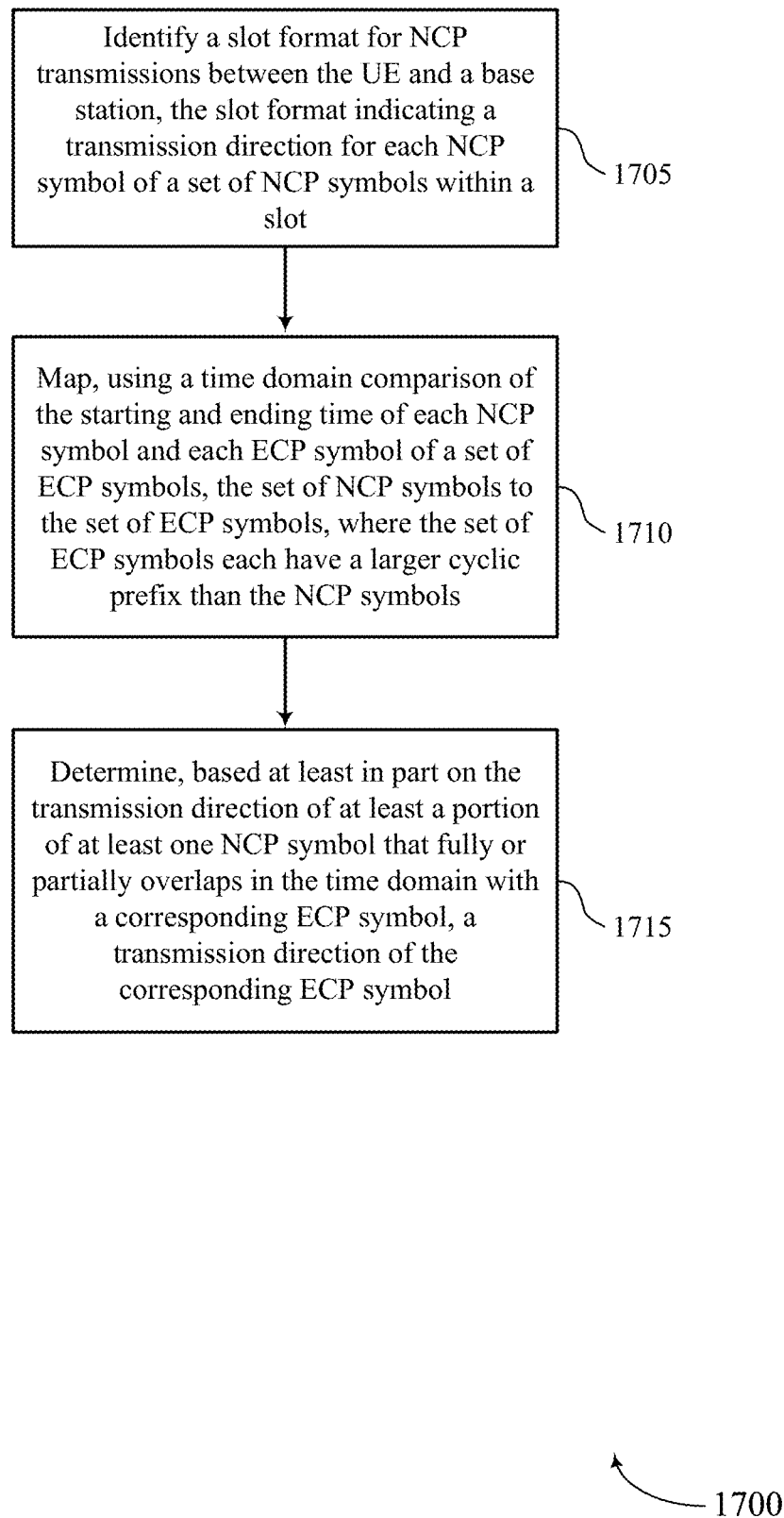
FIGS. 17 through 22 illustrate methods for slot format determination for extended cyclic prefix transmissions using normal cyclic prefix slot formats in accordance with aspects of the present disclosure.

FIG. 17 shows a flowchart illustrating a method 1700 for slot format determination for extended cyclic prefix transmissions using normal cyclic prefix slot formats in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1705, the UE 115 may identify a slot format for normal cyclic prefix (NCP) transmissions between the UE 115 and a base station 105, the slot format indicating a transmission direction for each NCP symbol of a set of NCP symbols within a slot. The operations of 1705 may be performed according to the methods described herein. In certain examples, aspects of the operations of 1705 may be performed by a SFI component as described with reference to FIGS. 9 through 12.

At 1710, the UE 115 may map, using a time domain comparison of the starting and ending time of each NCP symbol and each extended cyclic prefix (ECP) symbol of a set of ECP symbols, the set of NCP symbols to the set of ECP symbols, where the set of ECP symbols each have a larger cyclic prefix than the NCP symbols. The operations of 1710 may be performed according to the methods described herein. In certain examples, aspects of the operations of 1710 may be performed by a mapping component as described with reference to FIGS. 9 through 12.

At 1715, the UE 115 may determine, based at least in part on the transmission direction of at least a portion of at least one NCP symbol that fully or partially overlaps in the time domain with a corresponding ECP symbol, a transmission direction of the corresponding ECP symbol. The operations of 1715 may be performed according to the methods described herein. In certain examples, aspects of the operations of 1715 may be performed by a ECP transmission direction component as described with reference to FIGS. 9 through 12.

Figure 18:
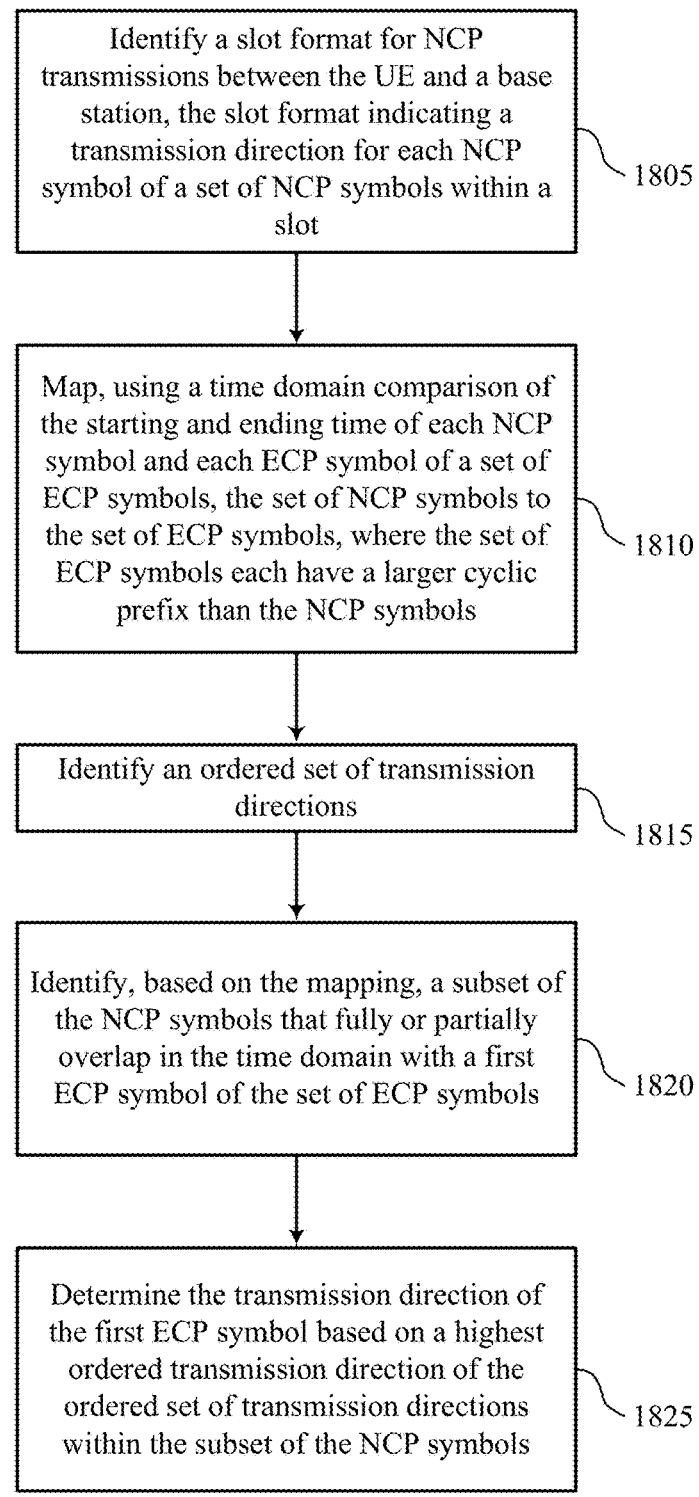

FIG. 18 shows a flowchart illustrating a method 1800 for slot format determination for extended cyclic prefix transmissions using normal cyclic prefix slot formats in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1805, the UE 115 may identify a slot format for normal cyclic prefix (NCP) transmissions between the UE 115 and a base station 105, the slot format indicating a transmission direction for each NCP symbol of a set of NCP symbols within a slot. The operations of 1805 may be performed according to the methods described herein. In certain examples, aspects of the operations of 1805 may be performed by a SFI component as described with reference to FIGS. 9 through 12.

At 1810, the UE 115 may map, using a time domain comparison of the starting and ending time of each NCP symbol and each extended cyclic prefix (ECP) symbol of a set of ECP symbols, the set of NCP symbols to the set of ECP symbols, where the set of ECP symbols each have a larger cyclic prefix than the NCP symbols. The operations of 1810 may be performed according to the methods described herein. In certain examples, aspects of the operations of 1810 may be performed by a mapping component as described with reference to FIGS. 9 through 12.

At 1815, the UE 115 may identify an ordered set of transmission directions. The operations of 1815 may be performed according to the methods described herein. In certain examples, aspects of the operations of 1815 may be performed by a transmission direction hierarchy component as described with reference to FIGS. 9 through 12.

At 1820, the UE 115 may identify, based at least in part on the mapping, a subset of the NCP symbols that fully or partially overlap in the time domain with a first ECP symbol of the set of ECP symbols. The operations of 1820 may be performed according to the methods described herein. In certain examples, aspects of the operations of 1820 may be performed by a mapping component as described with reference to FIGS. 9 through 12.

At 1825, the UE 115 may determine the transmission direction of the first ECP symbol based on a highest ordered transmission direction of the ordered set of transmission directions within the subset of the NCP symbols. The operations of 1825 may be performed according to the methods described herein. In certain examples, aspects of the operations of 1825 may be performed by a ECP transmission direction component as described with reference to FIGS. 9 through 12.

Figure 19:
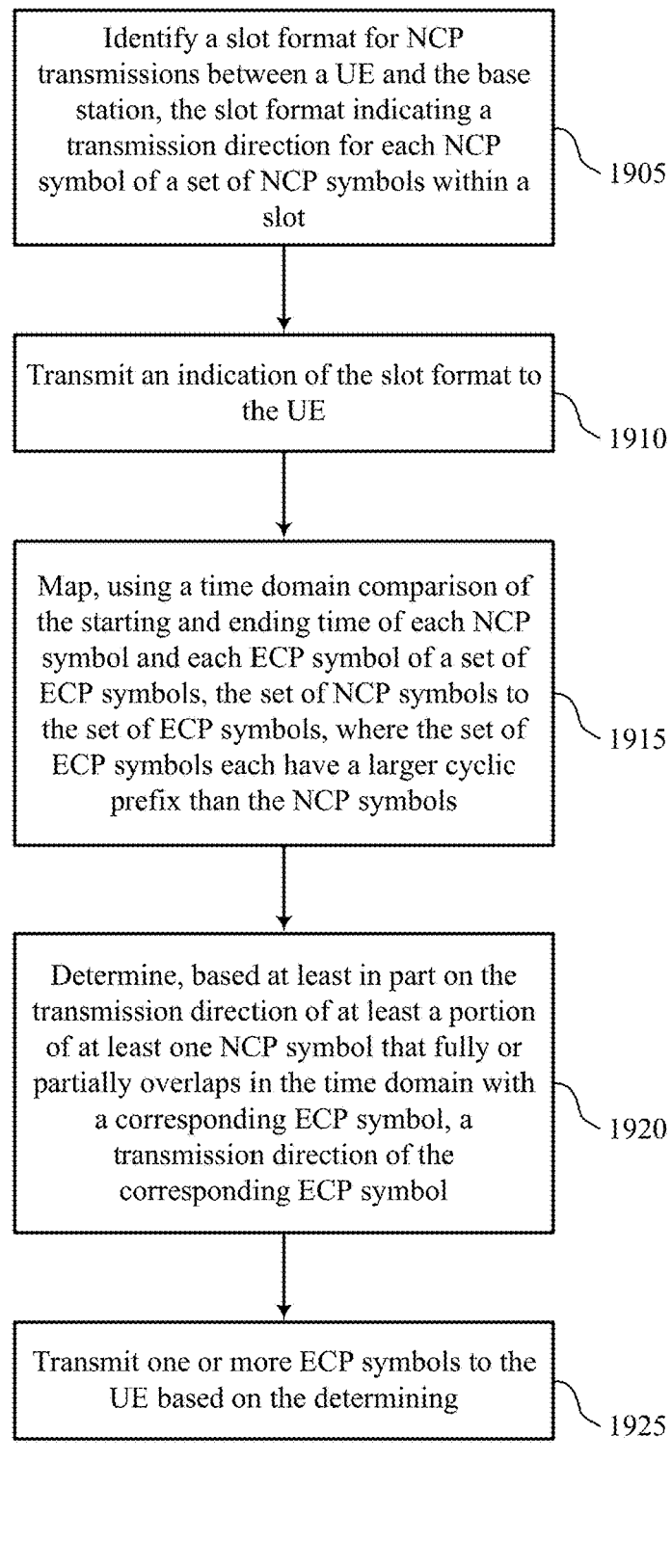

FIG. 19 shows a flowchart illustrating a method 1900 for slot format determination for extended cyclic prefix transmissions using normal cyclic prefix slot formats in accordance with aspects of the present disclosure. The operations of method 1900 may be implemented by a base station 105 or its components as described herein. For example, the operations of method 1900 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 1905, the base station 105 may identify a slot format for normal cyclic prefix (NCP) transmissions between a user equipment (UE) and the base station, the slot format indicating a transmission direction for each NCP symbol of a set of NCP symbols within a slot. The operations of 1905 may be performed according to the methods described herein. In certain examples, aspects of the operations of 1905 may be performed by a SFI component as described with reference to FIGS. 13 through 16.

At 1910, the base station 105 may transmit an indication of the slot format to the UE. The operations of 1910 may be performed according to the methods described herein. In certain examples, aspects of the operations of 1910 may be performed by a SFI component as described with reference to FIGS. 13 through 16.

At 1915, the base station 105 may map, using a time domain comparison of the starting and ending time of each NCP symbol and each extended cyclic prefix (ECP) symbol of a set of ECP symbols, the set of NCP symbols to the set of ECP symbols, where the set of ECP symbols each have a larger cyclic prefix than the NCP symbols. The operations of 1915 may be performed according to the methods described herein. In certain examples, aspects of the operations of 1915 may be performed by a mapping component as described with reference to FIGS. 13 through 16.

At 1920, the base station 105 may determine, based at least in part on the transmission direction of at least a portion of at least one NCP symbol that fully or partially overlaps in the time domain with a corresponding ECP symbol, a transmission direction of the corresponding ECP symbol. The operations of 1920 may be performed according to the methods described herein. In certain examples, aspects of the operations of 1920 may be performed by a ECP transmission direction component as described with reference to FIGS. 13 through 16.

At 1925, the base station 105 may transmit one or more ECP symbols to the UE based at least in part on the determining. The operations of 1925 may be performed according to the methods described herein. In certain examples, aspects of the operations of 1925 may be performed by a transmitter as described with reference to FIGS. 13 through 16.

Figure 20:
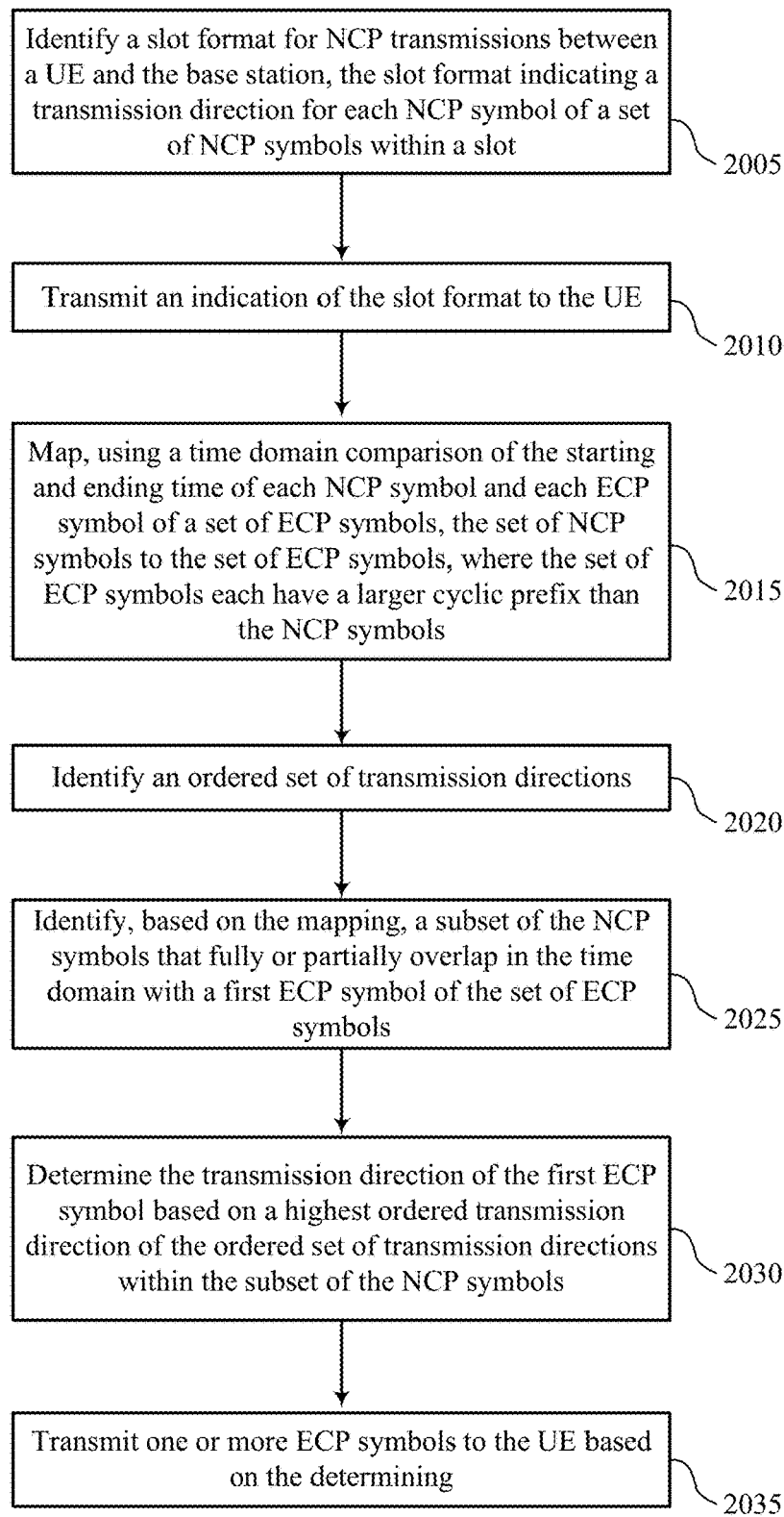

FIG. 20 shows a flowchart illustrating a method 2000 for slot format determination for extended cyclic prefix transmissions using normal cyclic prefix slot formats in accordance with aspects of the present disclosure. The operations of method 2000 may be implemented by a base station 105 or its components as described herein. For example, the operations of method 2000 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2005, the base station 105 may identify a slot format for normal cyclic prefix (NCP) transmissions between a user equipment (UE) and the base station, the slot format indicating a transmission direction for each NCP symbol of a set of NCP symbols within a slot. The operations of 2005 may be performed according to the methods described herein. In certain examples, aspects of the operations of 2005 may be performed by a SFI component as described with reference to FIGS. 13 through 16.

At 2010, the base station 105 may transmit an indication of the slot format to the UE. The operations of 2010 may be performed according to the methods described herein. In certain examples, aspects of the operations of 2010 may be performed by a SFI component as described with reference to FIGS. 13 through 16.

At 2015, the base station 105 may map, using a time domain comparison of the starting and ending time of each NCP symbol and each extended cyclic prefix (ECP) symbol of a set of ECP symbols, the set of NCP symbols to the set of ECP symbols, where the set of ECP symbols each have a larger cyclic prefix than the NCP symbols. The operations of 2015 may be performed according to the methods described herein. In certain examples, aspects of the operations of 2015 may be performed by a mapping component as described with reference to FIGS. 13 through 16.

At 2020, the base station 105 may identify an ordered set of transmission directions. The operations of 2020 may be performed according to the methods described herein. In certain examples, aspects of the operations of 2020 may be performed by a transmission direction hierarchy component as described with reference to FIGS. 13 through 16.

At 2025, the base station 105 may identify, based at least in part on the mapping, a subset of the NCP symbols that fully or partially overlap in the time domain with a first ECP symbol of the set of ECP symbols. The operations of 2025 may be performed according to the methods described herein. In certain examples, aspects of the operations of 2025 may be performed by a mapping component as described with reference to FIGS. 13 through 16.

At 2030, the base station 105 may determine the transmission direction of the first ECP symbol based on a highest ordered transmission direction of the ordered set of transmission directions within the subset of the NCP symbols. The operations of 2030 may be performed according to the methods described herein. In certain examples, aspects of the operations of 2030 may be performed by a ECP transmission direction component as described with reference to FIGS. 13 through 16. In some cases, the transmission direction indicates that an ECP symbol has an uplink transmission direction, a downlink transmission direction, or a flexible transmission direction, and where the flexible transmission direction has a highest ordered transmission direction in the ordered set of transmission directions, the downlink transmission direction has a middle ordered transmission direction in the ordered set of transmission directions, and the uplink transmission direction has a lowest ordered transmission direction in the ordered set of transmission directions.

At 2035, the base station 105 may transmit one or more ECP symbols to the UE 115 based at least in part on the determining. The operations of 2035 may be performed according to the methods described herein. In certain examples, aspects of the operations of 2035 may be performed by a transmitter as described with reference to FIGS. 13 through 16.

Figure 21:
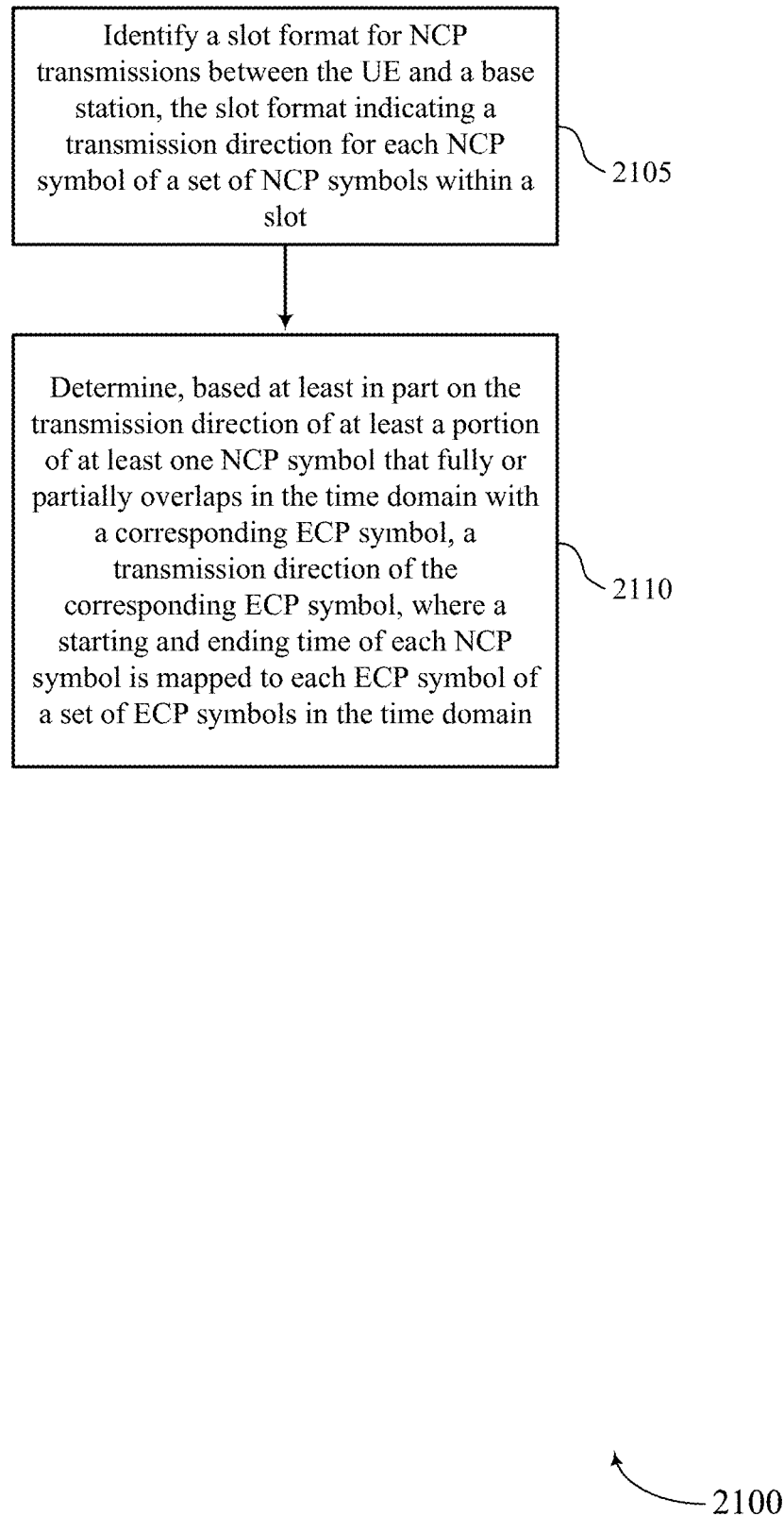

FIG. 21 shows a flowchart illustrating a method 2100 for slot format determination for extended cyclic prefix transmissions using normal cyclic prefix slot formats in accordance with aspects of the present disclosure. The operations of method 2100 may be implemented by a UE 115 or its components as described herein. For example, the operations of method 2100 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 2105, the UE 115 may identify a slot format for NCP transmissions between the UE 115 and a base station 105, the slot format indicating a transmission direction for each NCP symbol of a set of NCP symbols within a slot. The operations of 2105 may be performed according to the methods described herein. In certain examples, aspects of the operations of 2105 may be performed by a SFI component as described with reference to FIGS. 9 through 12.

At 2110, the UE 115 may determine, based at least in part on the transmission direction of at least a portion of at least one NCP symbol that fully or partially overlaps in the time domain with a corresponding ECP symbol, a transmission direction of the corresponding ECP symbol, where a starting and ending time of each NCP symbol is mapped to each ECP symbol of a set of ECP symbols in the time domain. The operations of 2110 may be performed according to the methods described herein. In certain examples, aspects of the operations of 2110 may be performed by a ECP transmission direction component as described with reference to FIGS. 9 through 12.

Figure 22:
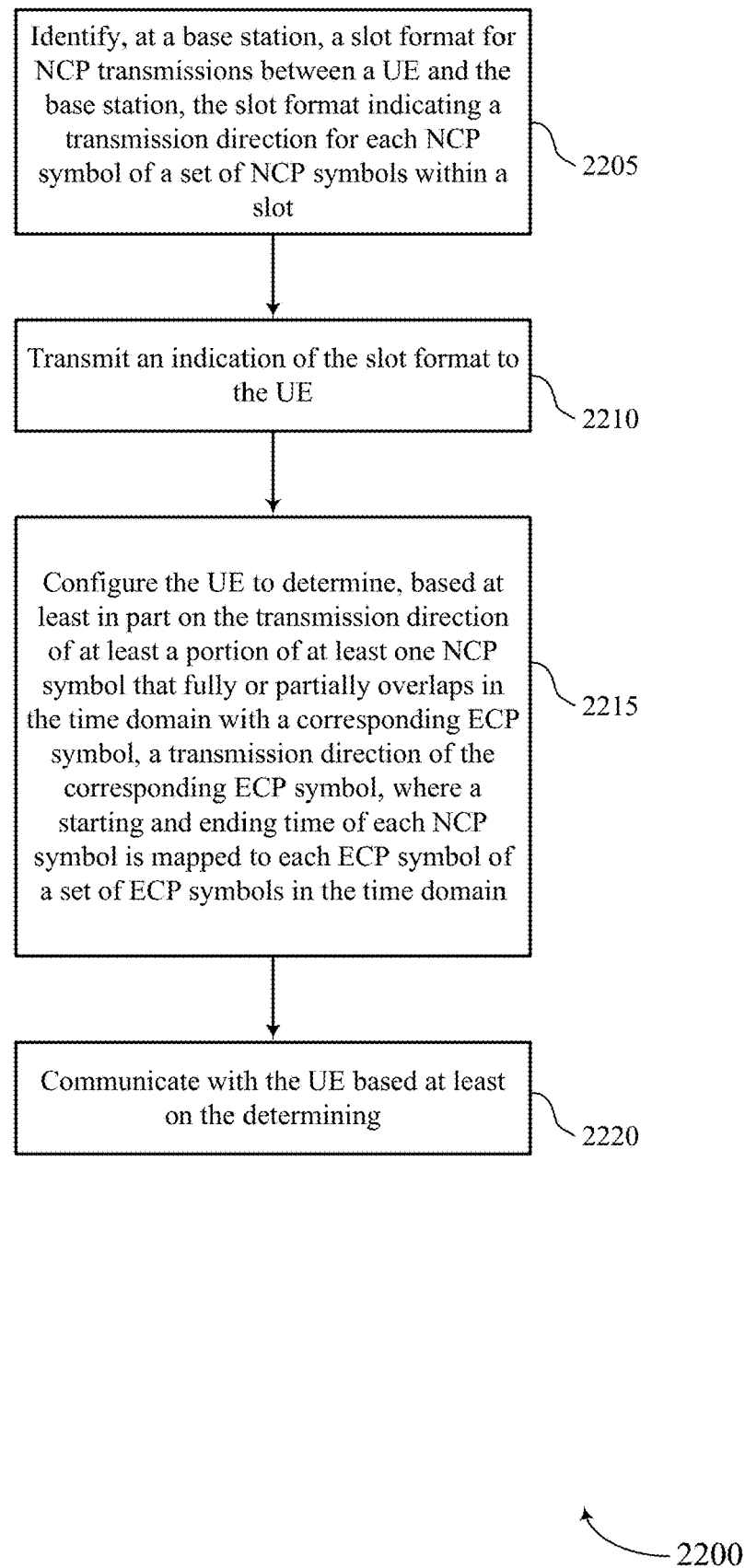

FIG. 22 shows a flowchart illustrating a method 2200 for slot format determination for extended cyclic prefix transmissions using normal cyclic prefix slot formats in accordance with aspects of the present disclosure. The operations of method 2200 may be implemented by a base station 105 or its components as described herein. For example, the operations of method 2200 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2205, the base station 105 may identify a slot format for normal cyclic prefix (NCP) transmissions between a UE and the base station, the slot format indicating a transmission direction for each NCP symbol of a set of NCP symbols within a slot. The operations of 2205 may be performed according to the methods described herein. In certain examples, aspects of the operations of 2205 may be performed by a SFI component as described with reference to FIGS. 13 through 16.

At 2210, the base station 105 may transmit an indication of the slot format to the UE. The operations of 2210 may be performed according to the methods described herein. In certain examples, aspects of the operations of 2210 may be performed by a SFI component as described with reference to FIGS. 13 through 16.

At 2215, the base station 105 may configure the UE 115 to determine, based at least in part on the transmission direction of at least a portion of at least one NCP symbol that fully or partially overlaps in the time domain with a corresponding ECP symbol, a transmission direction of the corresponding ECP symbol, where a starting and ending time of each NCP symbol is mapped to each ECP symbol of a set of ECP symbols in the time domain. The operations of 2215 may be performed according to the methods described herein. In certain examples, aspects of the operations of 2215 may be performed by base station communication manager as described with reference to FIGS. 13 through 16.

At 2220, the base station 105 may communicate with the UE 115 based at least in part on the determining. The operations of 2220 may be performed according to the methods described herein. In certain examples, aspects of the operations of 2220 may be performed by a transmitter, a receiver, or transceiver as described with reference to FIGS. 13 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying, at a user equipment (UE), a slot format for normal cyclic prefix (NCP) transmissions between the UE and a base station, the slot format indicating a transmission direction for each NCP symbol of a set of NCP symbols within a slot;
    determining, based at least in part on a first transmission direction of at least a portion of at least one NCP symbol that fully or partially overlaps in a time domain with a corresponding extended cyclic prefix (ECP) symbol, a second transmission direction of the corresponding ECP symbol, wherein a starting time and an ending time of each NCP symbol is mapped to each ECP symbol of a set of ECP symbols in the time domain, wherein the determining comprises:
        identifying a subset of the set of NCP symbols that overlap in the time domain with a first ECP symbol of the set of ECP symbols; and
        determining that the first ECP symbol has a flexible transmission direction when at least one NCP symbol of the subset of the set of NCP symbols has a flexible transmission direction; and
    communicating with the base station based at least in part on the determining.

2. The method of claim 1, wherein the determining further comprises:
    determining that the first ECP symbol has an uplink transmission direction when each NCP symbol of the subset of the set of NCP symbols has an uplink transmission direction; and
    determining that the first ECP symbol has a downlink transmission direction when each NCP symbol of the subset of the set of NCP symbols has a downlink transmission direction.

3. The method of claim 1, wherein the determining comprises:
    identifying an ordered set of transmission directions;
    identifying a subset of the set of NCP symbols that fully or partially overlap in the time domain with a first ECP symbol of the set of ECP symbols; and
    determining the transmission direction of the first ECP symbol based on a highest ordered transmission direction of the ordered set of transmission directions within the subset of the set of NCP symbols.

4. The method of claim 3, wherein the transmission direction indicates that an ECP symbol has an uplink transmission direction, a downlink transmission direction, or a flexible transmission direction, and wherein the flexible transmission direction has a highest ordered transmission direction in the ordered set of transmission directions, the downlink transmission direction has a middle ordered transmission direction in the ordered set of transmission directions, and the uplink transmission direction has a lowest ordered transmission direction in the ordered set of transmission directions.

5. The method of claim 1, wherein the determining comprises:
    identifying a subset of the set of NCP symbols that fully or partially overlap in the time domain with a first ECP symbol of the set of ECP symbols;
    determining one or more portions in the time domain of the first ECP symbol that correspond to one or more NCP symbols, or portions thereof, of the subset of the set of NCP symbols; and
    determining that the first ECP symbol transmission direction corresponds to the NCP symbol transmission direction of a longest of the one or more portions in the time domain of the first ECP symbol.

6. The method of claim 1, wherein the slot format is based on a reference sub-carrier spacing (SCS) for the NCP transmissions, and wherein the ECP symbols have a different SCS than the reference SCS.

7. The method of claim 1, wherein the slot format is identified based at least in part on a group common physical downlink control channel (GC-PDCCH) transmission received from the base station.

8. The method of claim 1, wherein the set of ECP symbols each have a larger cyclic prefix than the set of NCP symbols.

9. A method for wireless communication, comprising:
identifying, at a base station, a slot format for normal cyclic prefix (NCP) transmissions between a user equipment (UE) and the base station, the slot format indicating a transmission direction for each NCP symbol of a set of NCP symbols within a slot;
transmitting an indication of the slot format to the UE;
configuring the UE to determine, based at least in part on a first transmission direction of at least a portion of at least one NCP symbol that fully or partially overlaps in a time domain with a corresponding extended cyclic prefix (ECP) symbol, a second transmission direction of the corresponding ECP symbol, wherein a starting time and an ending time of each NCP symbol is mapped to each ECP symbol of a set of ECP symbols in the time domain, wherein the configuring comprises:
configuring the UE to identify a subset of the set of NCP symbols that overlap in the time domain with a first ECP symbol of the set of ECP symbols; and
configuring the UE to determine that the first ECP symbol has a flexible transmission direction when at least one NCP symbol of the subset of the set of NCP symbols has a flexible transmission direction; and
communicating with the UE based at least in part on the determining.

10. The method of claim 9, wherein the configuring comprises:
configuring the UE to determine that the first ECP symbol has an uplink transmission direction when each NCP symbol of the subset of the set of NCP symbols has an uplink transmission direction; and
configuring the UE to determine that the first ECP symbol has a downlink transmission direction when each NCP symbol of the subset of the set of NCP symbols has a downlink transmission direction.

11. The method of claim 9, wherein the configuring comprises:
configuring the UE to identify an ordered set of transmission directions;
configuring the UE to identify a subset of the set of NCP symbols that fully or partially overlap in the time domain with a first ECP symbol of the set of ECP symbols; and
configuring the UE to determine the transmission direction of the first ECP symbol based on a highest ordered transmission direction of the ordered set of transmission directions within the subset of the set of NCP symbols.

12. The method of claim 11, wherein the transmission direction indicates that an ECP symbol has an uplink transmission direction, a downlink transmission direction, or a flexible transmission direction, and wherein the flexible transmission direction has a highest ordered transmission direction in the ordered set of transmission directions, the downlink transmission direction has a middle ordered transmission direction in the ordered set of transmission directions, and the uplink transmission direction has a lowest ordered transmission direction in the ordered set of transmission directions.

13. The method of claim 9, wherein the configuring comprises:
configuring the UE to identify a subset of the set of NCP symbols that fully or partially overlap in the time domain with a first ECP symbol of the set of ECP symbols;
configuring the UE to determine one or more portions of the time domain of the first ECP symbol that correspond to one or more NCP symbols, or portions thereof, of the subset of the set of NCP symbols; and
configuring the UE to determine that the first ECP symbol transmission direction corresponds to the NCP symbol transmission direction of a longest of the one or more portions of the time domain of the first ECP symbol.

14. The method of claim 9, wherein the slot format is based on a reference sub-carrier spacing (SCS) for the NCP transmissions, and wherein the ECP symbols have a different SCS than the reference SCS.

15. The method of claim 9, wherein the slot format is identified based at least in part on a group common physical downlink control channel (GC-PDCCH) transmission received from the base station.

16. An apparatus for wireless communication, comprising:
a processor;
memory in electronic communication with the processor; and
instructions stored in the memory and executable by the processor to cause the apparatus to:
identify, at a user equipment (UE), a slot format for normal cyclic prefix (NCP) transmissions between the UE and a base station, the slot format indicating a transmission direction for each NCP symbol of a set of NCP symbols within a slot;
determine, based at least in part on a first transmission direction of at least a portion of at least one NCP symbol that fully or partially overlaps in the time domain with a corresponding extended cyclic prefix (ECP) symbol, a second transmission direction of the corresponding ECP symbol, wherein a starting time and an ending time of each NCP symbol is mapped to each ECP symbol of a set of ECP symbols in the time domain, wherein the instructions are further executable by the processor to cause the apparatus to:
identify a subset of the set of NCP symbols that overlap in the time domain with a first ECP symbol of the set of ECP symbols; and
determine that the first ECP symbol has a flexible transmission direction when at least one NCP symbol of the subset of the set of NCP symbols has a flexible transmission direction; and
communicate with the base station based at least in part on the determining.

17. The apparatus of claim 16, wherein the instructions are further executable by the processor to cause the apparatus to determine that the first ECP symbol has an uplink transmission direction when each NCP symbol of the subset of the set of NCP symbols has an uplink transmission direction, and determine that the first ECP symbol has a downlink transmission direction when each NCP symbol of the subset of the set of NCP symbols has a downlink transmission direction.

18. The apparatus of claim 16, wherein the instructions are further executable by the processor to cause the apparatus to:
- identify an ordered set of transmission directions;
- identify a subset of the set of NCP symbols that fully or partially overlap in the time domain with a first ECP symbol of the set of ECP symbols; and
- determine the transmission direction of the first ECP symbol based on a highest ordered transmission direction of the ordered set of transmission directions within the subset of the set of NCP symbols.

19. The apparatus of claim 18, wherein the transmission direction indicates that an ECP symbol has an uplink transmission direction, a downlink transmission direction, or a flexible transmission direction, and wherein the flexible transmission direction has a highest ordered transmission direction in the ordered set of transmission directions, the downlink transmission direction has a middle ordered transmission direction in the ordered set of transmission directions, and the uplink transmission direction has a lowest ordered transmission direction in the ordered set of transmission directions.

20. The apparatus of claim 16, wherein the instructions are further executable by the processor to cause the apparatus to identify a subset of the set of NCP symbols that fully or partially overlap in the time domain with a first ECP symbol of the set of ECP symbols, determine one or more portions in the time domain of the first ECP symbol that correspond to one or more NCP symbols, or portions thereof, of the subset of the set of NCP symbols, and determine that the first ECP symbol transmission direction corresponds to the NCP symbol transmission direction of a longest of the one or more portions in the time domain of the first ECP symbol.

21. The apparatus of claim 16, wherein the slot format is based on a reference sub-carrier spacing (SCS) for the NCP transmissions, and wherein the ECP symbols have a different SCS than the reference SCS.

22. The apparatus of claim 16, wherein the slot format is identified based at least in part on a group common physical downlink control channel (GC-PDCCH) transmission received from the base station.

23. The apparatus of claim 16, further comprising:
- a receiver;
- a transmitter; and
- instructions stored in the memory and executable by the processor to cause the apparatus to:
  - receive, via the receiver, configuration information from the base station; and
  - configure, based at least in part on the configuration information, the receiver or the transmitter to use a transmission direction of a ECP symbol corresponsive to one or more partially or fully overlapping NCP symbols determined based on a mapping.

24. An apparatus for wireless communication, comprising:
- a processor;
- memory in electronic communication with the processor; and
- instructions stored in the memory and executable by the processor to cause the apparatus to:
  - identify, at a base station, a slot format for normal cyclic prefix (NCP) transmissions between a user equipment (UE) and the base station, the slot format indicating a transmission direction for each NCP symbol of a set of NCP symbols within a slot;
  - transmit an indication of the slot format to the UE;
  - configure the UE to determine, based at least in part on a first transmission direction of at least a portion of at least one NCP symbol that fully or partially overlaps in the time domain with a corresponding ECP symbol, a second transmission direction of the corresponding ECP symbol, wherein a starting time and an ending time of each NCP symbol is mapped to each ECP symbol of a set of ECP symbols in the time domain, wherein the instructions are further executable by the processor to cause the apparatus to:
    - configure the UE to identify a subset of the set of NCP symbols that overlap in the time domain with a first ECP symbol of the set of ECP symbols; and
    - configure the UE to determine that the first ECP symbol has a flexible transmission direction when at least one NCP symbol of the subset of the set of NCP symbols has a flexible transmission direction; and
  - communicate with the UE based at least in part on the determining.

25. The apparatus of claim 24, wherein the instructions are further executable by the processor to cause the apparatus to configure the UE to determine that the first ECP symbol has an uplink transmission direction when each NCP symbol of the subset of the set of NCP symbols has an uplink transmission direction, and determine that the first ECP symbol has a downlink transmission direction when each NCP symbol of the subset of the set of NCP symbols has a downlink transmission direction.

26. The apparatus of claim 24, wherein the slot format is based on a reference sub-carrier spacing (SCS) for the NCP transmissions, and wherein the ECP symbols have a different SCS than the reference SCS.

* * * * *